United States Patent
Ghafourifar

(10) Patent No.: US 11,494,204 B2
(45) Date of Patent: Nov. 8, 2022

(54) MIXED-GRAINED DETECTION AND ANALYSIS OF USER LIFE EVENTS FOR CONTEXT UNDERSTANDING

(71) Applicant: Entefy Inc., Palo Alto, CA (US)

(72) Inventor: Alston Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 165 days.

(21) Appl. No.: 16/812,131

(22) Filed: Mar. 6, 2020

(65) Prior Publication Data

US 2021/0034386 A1 Feb. 4, 2021

Related U.S. Application Data

(63) Continuation of application No. 15/396,485, filed on Dec. 31, 2016, now abandoned.

(51) Int. Cl.
*G06F 16/00* (2019.01)
*G06F 9/451* (2018.01)
(Continued)

(52) U.S. Cl.
CPC .......... *G06F 9/451* (2018.02); *G06F 16/9535* (2019.01); *G10L 15/22* (2013.01); *H04L 43/045* (2013.01)

(58) Field of Classification Search
CPC .... G06F 16/904; G06F 16/951; G06F 3/0483; G06F 9/453; G06F 16/9024; G06F 16/24575; G06F 16/24578; G06F 16/248; G06F 16/90324; G06F 17/30958; G06F 16/285; G06F 16/9535; G06F 17/30;
(Continued)

(56) References Cited

U.S. PATENT DOCUMENTS

| 5,481,597 A | 1/1996 | Given |
| 5,951,638 A | 9/1999 | Hoss |

(Continued)

FOREIGN PATENT DOCUMENTS

| WO | 9931575 | 6/1999 |
| WO | 2013112570 A1 | 8/2013 |

OTHER PUBLICATIONS

Marr, Bernard, Key Business Analytics, Feb. 2016, FT Publishing International, Ch. 17 "Neural Network Analysis" (Year: 2016).

*Primary Examiner* — Yicun Wu
(74) *Attorney, Agent, or Firm* — Haynes and Boone, LLP

(57) ABSTRACT

Techniques for resolving multiple user requests from multiple user accounts by an interactive interface are described. An interactive interface can obtain a first multi-dimensional context graph for a first user account and a second context graph for a second user account. Each graph comprises correlated contexts related to the user account. The interface can also receive a first user request associated with the first user account and a second user request associated with the second user account; determine, based on the first graph, a first current context and one or more first previous contexts for the first user request; determine, based on the second graph, a second current context and one or more second previous contexts for the second user request; determine one or more interrelationships between the first and the second graphs; and resolve the user requests based on the contexts and the interrelationships.

20 Claims, 16 Drawing Sheets

(51) Int. Cl.
*G06F 16/9535* (2019.01)
*H04L 43/045* (2022.01)
*G10L 15/22* (2006.01)

(58) Field of Classification Search
CPC ......... G06F 17/30598; G06F 17/30864; G06F 17/30867
See application file for complete search history.

(56) References Cited

U.S. PATENT DOCUMENTS

| | | | |
|---|---|---|---|
| 6,101,320 | A | 8/2000 | Schuetze |
| 6,950,502 | B1 | 9/2005 | Jenkins |
| 7,317,929 | B1 | 1/2008 | El-Fishawy |
| 7,673,327 | B1 | 3/2010 | Polis |
| 7,734,705 | B1 | 6/2010 | Wheeler, Jr. |
| 7,886,000 | B1 | 2/2011 | Polis |
| 7,908,647 | B1 | 3/2011 | Polis |
| 8,090,787 | B2 | 1/2012 | Polis |
| 8,095,592 | B2 | 1/2012 | Polis |
| 8,108,460 | B2 | 1/2012 | Polis |
| 8,112,476 | B2 | 2/2012 | Polis |
| 8,122,080 | B2 | 2/2012 | Polis |
| 8,156,183 | B2 | 4/2012 | Polis |
| 8,281,125 | B1 | 10/2012 | Briceno |
| 8,296,360 | B2 | 10/2012 | Polis |
| 8,433,705 | B1 | 4/2013 | Dredze |
| 8,438,223 | B2 | 5/2013 | Polis |
| 8,458,256 | B2 | 6/2013 | Polis |
| 8,458,292 | B2 | 6/2013 | Polis |
| 8,458,347 | B2 | 6/2013 | Polis |
| 8,468,202 | B2 | 6/2013 | Polis |
| 8,468,445 | B2 | 6/2013 | Gupta |
| 8,527,525 | B2 | 9/2013 | Fong |
| 8,959,156 | B2 | 2/2015 | Polis |
| 9,088,533 | B1 | 7/2015 | Zeng |
| 9,529,522 | B1 | 12/2016 | Barros |
| 10,037,617 | B2 * | 7/2018 | Ebtekar ................ G06F 3/0481 |
| 2002/0133509 | A1 | 9/2002 | Johnston |
| 2002/0160757 | A1 | 10/2002 | Shavit |
| 2002/0178000 | A1 | 11/2002 | Aktas |
| 2002/0194322 | A1 | 12/2002 | Nagata |
| 2003/0096599 | A1 | 5/2003 | Takatsuki |
| 2004/0137884 | A1 | 7/2004 | Engstrom |
| 2004/0177048 | A1 | 9/2004 | Klug |
| 2004/0243719 | A1 | 12/2004 | Roselinsky |
| 2004/0266411 | A1 | 12/2004 | Galicia |
| 2005/0015443 | A1 | 1/2005 | Levine |
| 2005/0101337 | A1 | 5/2005 | Wilson |
| 2006/0193450 | A1 | 8/2006 | Flynt |
| 2006/0212757 | A1 | 9/2006 | Ross |
| 2007/0100680 | A1 | 5/2007 | Kumar |
| 2007/0130273 | A1 | 6/2007 | Huynh |
| 2007/0180130 | A1 | 8/2007 | Arnold |
| 2008/0062133 | A1 | 3/2008 | Wolf |
| 2008/0088428 | A1 | 4/2008 | Pitre |
| 2008/0261569 | A1 | 10/2008 | Britt |
| 2008/0263103 | A1 | 10/2008 | McGregor |
| 2008/0288589 | A1 | 11/2008 | Ala-Pietila |
| 2009/0016504 | A1 | 1/2009 | Mantell |
| 2009/0119370 | A1 | 5/2009 | Stern |
| 2009/0150431 | A1 * | 6/2009 | Schmidt ................ G06F 16/284 |
| 2009/0177744 | A1 | 7/2009 | Marlow |
| 2009/0181702 | A1 | 7/2009 | Vargas |
| 2009/0187846 | A1 | 7/2009 | Paasovaara |
| 2009/0271486 | A1 | 10/2009 | Ligh |
| 2009/0292814 | A1 | 11/2009 | Ting |
| 2009/0299996 | A1 | 12/2009 | Yu |
| 2010/0198880 | A1 | 8/2010 | Petersen |
| 2010/0210291 | A1 | 8/2010 | Lauer |
| 2010/0312644 | A1 | 12/2010 | Borgs |
| 2010/0323728 | A1 | 12/2010 | Gould |
| 2010/0325227 | A1 | 12/2010 | Novy |
| 2011/0051913 | A1 | 3/2011 | Kesler |
| 2011/0078247 | A1 | 3/2011 | Jackson |
| 2011/0130168 | A1 | 6/2011 | Vendrow |
| 2011/0194629 | A1 | 8/2011 | Bekanich |
| 2011/0265010 | A1 | 10/2011 | Ferguson |
| 2011/0279458 | A1 | 11/2011 | Gnanasambandam |
| 2012/0209847 | A1 | 8/2012 | Rangan |
| 2012/0221962 | A1 | 8/2012 | Lew |
| 2013/0151508 | A1 | 6/2013 | Kurabayashi |
| 2013/0262852 | A1 | 10/2013 | Roeder |
| 2013/0267264 | A1 | 10/2013 | Abuelsaad |
| 2013/0304830 | A1 | 11/2013 | Olsen |
| 2013/0332308 | A1 | 12/2013 | Linden |
| 2014/0297807 | A1 | 10/2014 | Dasgupta |
| 2014/0355907 | A1 | 12/2014 | Pesavento |
| 2015/0019406 | A1 | 1/2015 | Lawrence |
| 2015/0039887 | A1 | 2/2015 | Kahol |
| 2015/0149484 | A1 | 5/2015 | Kelley |
| 2015/0281184 | A1 | 10/2015 | Cooley |
| 2015/0339405 | A1 * | 11/2015 | Vora ................ G06F 16/9024 707/723 |
| 2016/0048548 | A1 | 2/2016 | Thomas |
| 2016/0087944 | A1 | 3/2016 | Downey |
| 2017/0039246 | A1 | 2/2017 | Bastide |
| 2017/0039296 | A1 | 2/2017 | Bastide |
| 2017/0116578 | A1 | 4/2017 | Hadatsuki |
| 2017/0206276 | A1 * | 7/2017 | Gill ................ G06F 16/285 |
| 2017/0279687 | A1 | 9/2017 | Muntes-Mulero |
| 2017/0364587 | A1 | 12/2017 | Krishnamurthy |
| 2018/0048661 | A1 | 2/2018 | Bird |
| 2018/0121603 | A1 | 5/2018 | Devarakonda |
| 2018/0176108 | A1 | 6/2018 | Llagostera |

* cited by examiner

MIXED-GRAINED DETECTION AND ANALYSIS OF USER LIFE EVENTS FOR CONTEXT UNDERSTANDING

CROSS-REFERENCE TO RELATED APPLICATIONS

This application is a continuation of U.S. patent application Ser. No. 15/396,485, filed Dec. 31, 2016. This application is related to the following applications: U.S. patent application Ser. No. 15/396,503, filed Dec. 31, 2016; U.S. patent application Ser. No. 15/396,481, filed Dec. 31, 2016; and U.S. patent application Ser. No. 15/396,484, filed Dec. 31, 2016. Each of these related applications is incorporated by reference in its entirety.

FIELD

Embodiments described herein relate to interactive interfaces (e.g., intelligent personal assistants (IPAs), virtual assistants, knowledge navigators, chatbots, command-response engines, other software/hardware agents capable of performing actions on behalf of or for an entity, etc.). More particularly, embodiments described herein relate to one or more techniques of correlating clusters of contexts (context clusters") of a user account that corresponds to an entity for use by an intelligent interactive interface ("intelli-interface") to perform actions on behalf of or for the user account.

BACKGROUND

Modern consumer electronics are capable of enabling interactive interfaces (e.g., intelligent personal assistants (IPAs), virtual assistants, knowledge navigators, chatbots, command-response engines, other software/hardware agents capable of performing actions on behalf of or for an entity, etc.) to perform actions on behalf of or for user accounts that correspond to entities. That is, these interfaces can receive requests (in the form of inputs) from an entity (e.g., a person, a service, a smart device, etc.) and respond to the requests accordingly. For example, at least one currently available interactive interface can respond to a user's request received via input (e.g., text input, voice input, gesture input, etc.) for nearby restaurants with a list of establishments within a predetermined location of the user. The output can be provided to the user as textual output, image output (e.g., graphics, video, etc.), audio output, haptic output, tactile output, any combination thereof, or any other known output.

One problem associated with some interactive interfaces is their inability to multi-task—that is, some interactive interfaces cannot receive multiple user requests that are ambiguous or contextually unrelated, manage the multiple user requests concurrently, and resolve the multiple user requests. For example, some typical interactive interfaces cannot receive a first request to "find nearby restaurants" and a second user request to "find nearby bookstores", manage the requests concurrently, and resolve both user requests. In this example, none of the user requests are resolved before the other one is received. Consequently, these types of interactive interfaces can only receive and resolve a single request before being able to receive (and resolve) another request. This leads to one-purpose-one-action type of interactive interfaces that require users to follow restrictive patterns of usage in order to migrate from one task to another, which can contribute to or cause user dissatisfaction.

Another problem associated with some interactive interfaces is their relative inability to provide relevant predictive and reactive solutions to a user's requests based on the user's context. This may be because traditional techniques of context derivation are not precise enough. For example, at least one typical context derivation technique relies on time-based principles. Generally, these time-based approaches can be based on temporal locality principles or spatial locality principles. Stated differently, at least one typical context derivation technique bases its context determinations exclusively on time-based data, such as recent locations or recent interactions, as a way of developing an insight into a user's context. Such a technique can yield inaccurate predictions, which can cause interactive interfaces relying on this context derivation technique to generate irrelevant solutions to user requests. Irrelevant solutions can contribute to or cause user dissatisfaction.

Yet another problem associated with some interactive interfaces is their inability to partition knowledge used for servicing user requests into manageable data sets. This is exemplified when user context determinations are considered at either a fine-grained context level (e.g., the user is currently at a location with a latitude and longitude of 48.869701, 2.307909, etc.) or a more broadly defined level (e.g., the user is currently on planet Earth, etc.). An incorrect context determination can limit the functionality of an interactive interface that is designed to provide relevant predictive and reactive solutions to a user's requests. Too fine-grained or narrow a context and the interactive interface will lack enough data to provide relevant and/or reliable solutions to a user's requests. Too broadly defined or high level a context and the interactive interface will also lack enough data to accurately provide relevant and/or reliable solutions to a user's requests. For example, if a user asks his interactive interface to suggest items to buy during a trip to a local grocery store and the user has provided the assistant with the following data: underwear, paper towels, and a flashlight. Without a technique for determining the user's proper context and feeding the determined technique to the interactive interface, irrelevant suggestions may be output to the user by the interactive interface.

The problems discussed above can cause an interactive interface to operate inefficiently because it has to perform multiple attempts in order to resolve a single user request. This inefficient operation can, in turn, result in wasted computational resources. For example, computational resources that would otherwise not be necessary may be needed by an interactive assistant to service a single user request due to errors. Waste includes, but is not limited to, processing power for performing and/or repeating the performance of queries or transactions associated with resolving user requests and storage memory space for storing data about the incorrect or improper resolutions of user requests.

For at least the reasons set forth in this section of the present disclosure, some interactive interfaces remain suboptimal.

BRIEF DESCRIPTION OF THE DRAWINGS

Embodiments described herein are illustrated by examples and not limitations in the accompanying drawings, in which like references indicate similar features. Furthermore, in the drawings some conventional details have been omitted so as not to obscure the inventive concepts described herein.

DETAILED DESCRIPTION

Figure 1:
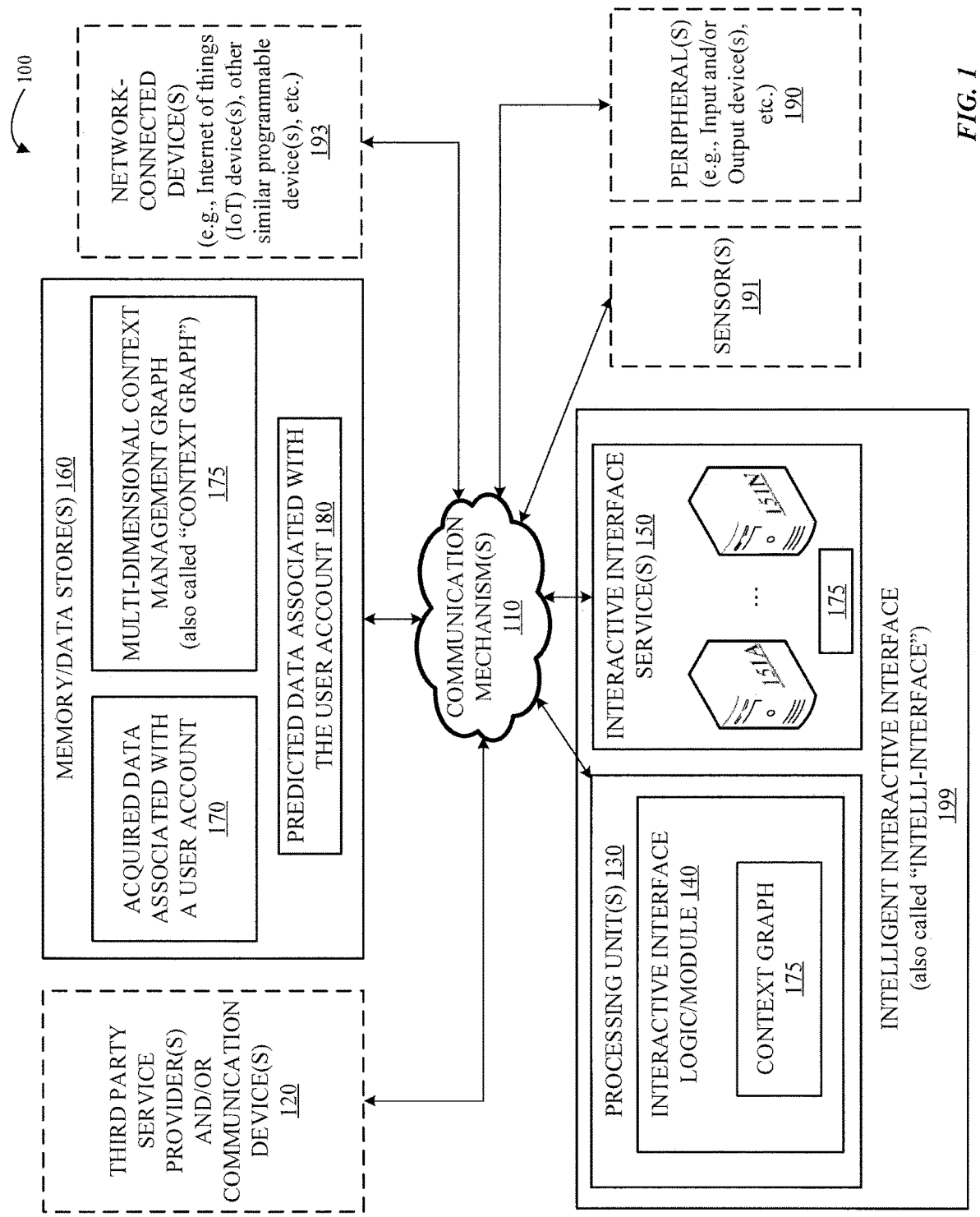
FIG. 1 illustrates, in block diagram form, an exemplary architecture that includes electronic components for servicing user requests by an intelligent interactive interface ("intelli-interface") in accordance one or more embodiments.

Methods, apparatuses, computer readable media, and systems for one or more techniques of correlating clusters of contexts (context clusters") of a user account that corresponds to an entity for use by an intelligent interactive interface ("intelli-interface") to perform actions on behalf of or for the user account are described. Such embodiments can, among others, enable an intelli-interface to service or resolve user requests based on holistic task intent and fulfillment criteria.

As used herein, an "intelligent interactive interface," "intelli-interface," and their variations refer to an intelligent user interface that employs artificial intelligence to enable interaction between a user and one or more computer systems in accordance with the embodiments described herein. At least one embodiment of an intelligent interactive interface as described herein receives one or more user requests in the form of input (e.g., text, audio, touch, gesture, environs from a sensor, any type of known input, etc.) and interacts with one or more computer systems to service or resolve the user requests. The embodiments of an intelli-interface described herein have advantages over some currently available interactive interfaces. These advantages include, but are not limited to, assisting with multi-tasking (e.g., receiving multiple user requests, managing the multiple user requests concurrently, and resolving the multiple user requests, etc.); assisting with providing relevant predictive and reactive solutions to a user's requests (e.g., based on one or more context management graphs that include information about the user, etc.); and assisting with partitioning knowledge used for servicing user requests into manageable data sets (e.g., by use of context clusters, by use of a context tier, by caching a context tier, etc.). An intelli-interface, therefore, can represent improvements to computer functionality. For example, the advantages of an intelli-interface described herein can assist with enabling an intelli-interface to perform fewer attempts than some currently available interactive interfaces in order to resolve a single user request. This reduction in the number attempts shows that an intelli-interface can operate more efficiently than some currently available interactive interfaces. That is, an intelli-interface can assist with reducing wasted computational resources (e.g., computational resources that would otherwise not be necessary due to errors associated with servicing a single user request, etc.). An intelligent interactive interface can include one or more of the many different types of interactive interfaces, including, among others, graphical user interfaces (GUIs), conversational interfaces, natural language interfaces, zero-input interfaces, holographic user interfaces, any other type of user interface capable of enabling interactions between a user and one or more computer systems. As described in further detail below, at least one embodiment of an intelligent interactive interface can be implemented using software, hardware, or a combination thereof.

As used herein, "servicing user requests," "resolving user requests," and their variations refer to an intelli-interface's performance of one or more actions in response to inputs received by the interface. The inputs can be received by the intelli-interface from one or more users, one or more sensors, and/or one or more peripherals. Performed actions are presented as outputs and can be presented in any output form (e.g., text, audio, graphics, image, video, haptic, a combination thereof, any other type of known output, etc.). An example of a serviced user request would be an intelli-interface performing all of the necessary actions required for sending an email in response to one or more inputs received by the intelli-interface. These actions include, but are not limited to, directing the user device's interface to open an email message window, pre-populate the To: field of the email message with contact information, pre-populate the Subject: field of the email message, etc.), as well as, tracking all pieces of data that may related to this particular task (e.g., search for contact information, communications with APIs and servers required for composing a message, etc.). Another example of a resolved request would be an intelli-interface presenting, via any known output form, a suggestion to a user in response to one or more inputs received by the interface. Other examples are possible and will be evident from the accompanying description below and the drawings.

As used herein, an "entity" refers to a person (e.g., a user, another user, etc.), an organization (e.g., a corporation, a non-profit company, etc.), a service (e.g., a ride sharing service, a word processing service, a messaging service, any other type of known service, etc.), or a network-connected device (e.g., an internet of things ("IoT") device, a smart device, etc.).

As used herein, a "user account" refers to a collection of data about a user of an intelli-interface. This collection of data includes, but is not limited to, data about the user's relationships with one or more entities, data about the user's habits, data about the user's communications or interactions with one or more entities, data about the user's preferences, data about the user's credentials for accessing or communicating with one or entities, etc.

FIG. 1 illustrates, in block diagram form, an exemplary architecture 100 that includes electronic components for servicing user requests by an intelli-interface in accordance with one or more embodiments. Components in the architecture 100 can be spatially separated and implemented on separate computing systems that are connected to or coupled to each other via the communication mechanism(s) 110, as described in further detail below. Alternatively, two or more components of the architecture 100 can be housed in single computing system, such as a desktop computer system, a laptop computer system, a tablet computer system, a server computer system, a mobile phone, a media player, a personal digital assistant (PDA), a personal communicator, a gaming device, a network router or hub, a wired or wireless access point (AP) or repeater, a set-top box, a wearable computing system, a vehicle, a network-connected device, a combination thereof, etc.

For one embodiment, the architecture 100 may include processing unit(s) 130, memory or data store(s) 160, third ($3^{rd}$) party service provider(s) and/or communication device(s) 120, sensor(s) 191, peripheral(s) 190, and network-connected device(s) 193. For one embodiment, one or more components in the architecture 100 may be implemented as one or more integrated circuits (ICs). For example, at least one of the processing unit(s) 130, the communication mechanism(s) 110, the $3^{rd}$ party service(s)/device(s) 120, the peripheral(s) 190, the sensor(s) 191, the network-connected device(s) 193, or the memory 160 can be implemented as a system-on-a-chip (SoC) IC, a three-dimensional (3D) IC, any other known IC, or any known IC combination. For another embodiment, two or more components in the architecture 100 are implemented together as one or more ICs. Each component of architecture 100 is described below.

The processing unit(s) 130 can include, but are not limited to, central processing units (CPUs), graphical processing units (GPUs), other integrated circuits (ICs), memory, and/or other electronic circuitry. For one embodiment, the processing unit(s) 130 manipulates and/or processes data (e.g., data associated with user accounts, data comprising contexts and events, data associated with processing operations/algorithms/techniques, etc.). The processing unit(s) 130 may include an interactive interface module/logic 140 for servicing user requests in accordance with one or more embodiments, as described herein. For one embodiment, the interactive interface module/logic 140 is implemented as hardware (e.g., electronic circuitry associated with the processing unit(s) 130, circuitry, dedicated logic, etc.), software (e.g., one or more instructions associated with a computer program executed by the processing unit(s) 130, software run on a general-purpose computer system or a dedicated machine, etc.), or a combination thereof.

The interactive interface module/logic 140 can be employed in cooperation with one or more interactive interface service(s) 150 and a context management graph 175 to perform tasks on behalf of users. Collectively, the interactive interface module/logic 140, interactive interface service(s) 150, and the context management graph 175 are referred to herein as an intelli-interface 199.

The module/logic 140 may be part of a computing system (e.g., a laptop, a wearable, a vehicle, a programmable device, any other type of computing system, etc.) capable of presenting an interface to a user. The presented interface can include a graphical user interface or any other known user interface (e.g., a multi-modal user interface, etc.). User requests can be provided to the architecture 100 in the form of user inputs via peripheral(s) 190 and/or environs captured by sensor(s) 191, which are described in further detail below. User inputs may be provided in a conversational manner, which the interactive interface module/logic 140 can also respond in a conversational manner. For example, in response to a query from the user 106 to "find the nearest bookstore," the interactive interface module/logic 140 can respond to the query by providing information through an interface presented via an output device 190 that identifies one or more closely located bookstores. As shown by the preceding example, a user can communicate with the interactive interface module/logic 140 in a natural language format. For one embodiment, the interactive interface module/logic 140 is configured for multi-modal input/output (e.g., receive and/or respond in audio or speech, text, touch, gesture, etc.), multi-language communication (e.g., receive and/or respond according to any type of human language), multi-channel communication (e.g., carry out conversations through a variety of computing devices), and other types of input/output or communication. This form of communication can be implemented via peripheral(s) 190 and/or sensor(s) 191, which are described below.

For one embodiment, the service(s) 150 include computing systems 151A-N, which manage access to and/or functionality associated with the interactive interface module/logic 140. As the interactive interface module/logic 140 performs tasks in cooperation with service(s) 150, the interactive interface module/logic 140 may communicate, via the communication mechanism(s) 110, with at least one of: (i) one or more $3^{rd}$ party service provider(s) and/or communication device(s) 120; (ii) network-connected device(s) 193; (iii) memory/data store(s) 160; (iv) sensor(s) 191; or peripheral(s) 190.

For one embodiment, the intelli-interface 199 enables generation and use of a multi-dimensional context management graph (hereinafter "multi-dimensional context graph" or "context graph") 175. The context graph 175 can be established as the knowledge based system that includes a knowledge base and/or an inference engine for training and/or querying of a neural network. Consequently, the intelli-interface 199 can receive multiple user requests and resolve these requests based on the context graph 175. More details about generation and use of the context graph 175 by the interactive interface module/logic 140 are described below.

The intelli-interface 199 can obtain or receive any type of data associated with servicing user requests by an interactive interface. This data includes digitalized data representing one or more activities associated with a user account. The data can, for example, also include data stored in memory/data store(s) 160. For one embodiment, and as shown in FIG. 1, this data can include acquired data 170 and/or predicted data 180. As used herein, "acquired data" refers to historical and current data about activities being performed or that were previously performed on behalf of a user account. The data can optionally also include predicted data 180, which refers to data resulting from processing acquired data. For yet another embodiment, the data includes information from one or more of provider(s)/device(s) 120, network-connected device(s) 193, sensor(s) 191, and peripheral(s) 190.

One difference between acquired data 170 and predicted data 180 is that the acquired data 170 represents "hard data." That is, the data 170 is known with a high degree of certainty, such as records of past activities or a record of current activity. Acquired data 170 can refer to any or all attributes of activities associated with a user account. Exemplary data 170 includes, but is not limited to, the following: a predetermined time interval; an event scheduled to occur in a predetermined time interval; a geolocation to be visited in a predetermined time interval; one or more identified persons associated with a predetermined time; an event scheduled for a predetermined time, or a geolocation to be visited at predetermined time; weather metadata describing weather associated with a particular period in time (e.g., rain, snow, sun, temperature, etc.); season metadata describing a season associated with capture of the image. For some embodiments, the acquired data 170 can be obtained from $3^{rd}$ party service provider(s) and/or device(s) 120, a social networking service, a weather reporting service, a calendar service, an address book service, any other type of service, or from any type of data store accessible via a wired or wireless network (e.g., the Internet, a private intranet, etc.).

On the other hand, predicted data 180 is "soft data." That is, predicted data 180 is data about future activities associated a user. For one embodiment, predicted data 180 is the result of performing at least one of the following: (i) data mining the acquired data 170; (ii) analyzing the acquired data 170; (iii) applying logical rules to the acquired data 170; or (iv) any other known methods used to infer new information from provided or acquired information. For example, acquired data 170 may include a user's interactions with a ride sharing service, while predicted data 180 may include predictions about a location that the user might use the ride sharing service to travel to. For this example, the data about the user's interactions with the ride sharing service may be combined with other acquired data 170 (e.g., calendar appointments, known frequent locations, etc.) and processed to make the prediction.

Referring again to FIG. 1, the intelli-interface 199 uses the acquired data 170 and/or the predicted data 180 to generate the context graph 175. As shown in FIG. 1, all or some of the context graph 175 can be stored in the processing unit(s) 130, the memory 160, and/or the service(s) 150. As used herein, a "multi-dimensional context graph," a "context graph" and their variations refer to a multi-dimensional, dynamically organized collection of data used by the intelli-interface 199 for deductive reasoning. For one embodiment, a context graph acts as a knowledge based system that includes a knowledge base and/or an inference engine for a neural network. Consequently, the context graph is a dynamic resource that has the capacity to "learn" as new information (e.g., data 170, data 180, etc.) is added to it. A context graph, as a knowledge based system of a neural network, enables more than accessing information and extrapolating data for inferring or determining additional data—it can also be used for classification (e.g., pattern and sequence recognition, novelty detection, sequential decision making, etc.); and data processing (e.g., filtering, clustering, blind source separation and compression, etc.). As used herein, a "dimension" refers to an aspect upon which contexts may be related, classified, or organized. A dimension can be based on time, location, event, or entity.

The context graph 175 may include multiple nodes and edges. Each node can represent one or more units of data (e.g., the acquired data 170, the predicted data 180, a combination thereof, a context, an event, etc.). Each edge (which may or may not be weighted) can represent relationships or correlations between the nodes.

For one embodiment, each node represents a context. As used herein, the term "context" and its variations refer to a category of one or more events. Events are described below. Conceptually, a context can be thought of as a container that holds one or more events such that each container includes only similar or related events. Contexts can have varying levels of granularity. Contexts may be differentiated based on their varying levels of granularity. For one embodiment, there are at least two distinct types of contexts that can be identified based on granularity levels—(i) a macro context; and (ii) a micro context. For example, macro contexts include broadly defined categories (e.g., restaurants visited by user A, grocery stores where user A shops, etc.), while micro contexts include more narrowly defined categories (e.g., a type of item purchased by User A on a specific date at a specific location, etc.). Consequently, a macro context can include one or more micro contexts. For example, a macro context, which represents all of user A's interactions with restaurants in California, USA can include micro context that represents all of user A's interactions with restaurants in Palo Alto, Calif., USA. Context may also be differentiated based on their temporal properties. For one embodiment, there are at least two distinct types of contexts that can be identified based on temporal properties—(i) a current context (also referred to herein as "an open context"); and (ii) a previous context (also referred to herein as "a closed context"). Open contexts are on-going contexts that have not been resolved or closed because one or more future events can be included as part of the category. An open context can, for example, include events that User A performs every day habitually, events that User A will perform at some future date, etc. Closed contexts are contexts that have been resolved. Examples of a closed context include a single visit to the doctor for surgery that happened on a specific day last year, a particular communication (e.g., text, phone call, email, etc.) that was received yesterday, etc. Furthermore, two or more contexts may include the same event this is because a single event can categorized under multiple categories. In addition, contexts can be contingent upon one another. Consequently, and for one embodiment, each node in context graph 175 represents a category of one or more events associated with a user account serviced by an interactive interface. These categories are used organize the data 170 and/or 180 into manageable sets. Contexts can be perpetually created on an on-going basis. For one embodiment, contexts are never deleted. Instead, and for this embodiment, contexts are maintained as nodes in the graph 175 and can be retrieved by the intelli-interface 199 on an as-needed basis.

As used herein, the term "event," "user life event," and their variations refer to any data and/or changes in data associated with a user. Exemplary events include, but are not limited to, one or more activities performed by the user, one or more activities associated with a relationship between the user and one or more entities, and one or more changes in status of a relationship between the user and one or more entities. Conceptually, events may take the form, for example, of a user attending a wedding, a particular communication (e.g., text, phone call, email, etc.) associated with a user, an appointment associated with a user, a location associated a user, a preference associated with a user, a familial relationship between the user and another person, an interaction between the user and an IoT device, an interaction between the user and an online merchant, etc. Events can be determined by analyzing data associated with a user account (e.g., data 170, data 180, etc.). Furthermore, relationships between the data 170 itself, the data 180 itself, and a combination of the data 170 and the data 180 can be determined by analysis and/or processing techniques (e.g., data mining techniques, data analysis and analytics techniques, etc.). Events and the relationships between the events can be perpetually created on an on-going basis. For one embodiment, events and their corresponding relationships are never deleted. Instead, and for this embodiment, events and their corresponding relationships are stored away in the memory/data stores 160 and can be retrieved by the intelli-interface 199 on an as-needed basis. In some scenarios, each event can comprise one or more events. For example, within a major user life event (e.g., a friendship between A and B spanning 10 years, etc.), there can be multiple minor user life events (e.g., a work relationship between A and B that spanned 1 year and was within their friendship of 10 years, a party that both A and B attended on a particular day within their friendship of 10 years, etc.). An event can be a "hard event," which is an event that is based on acquired data (e.g., acquired data 170, etc.). An event may also be a "soft event," which is an event that is based on predicted data (e.g., predicted data 180, etc.). As is known, predicted data always carries some probability of existence, so it may or may not come into actual existence. An event includes, but is not limited to the following: a gathering of one or more persons to perform an activity (e.g., a holiday, a vacation, a birthday, a dinner, a project, a work-out session, etc.); a sporting event (e.g., an athletic competition, etc.); a ceremony (e.g., a ritual of cultural significance that is performed on a special occasion, etc.); a meeting (e.g., a gathering of individuals engaged in some common interest, etc.); a festival (e.g., a gathering to celebrate some aspect in a community, etc.); a concert (e.g., an artistic performance, etc.); a media event (e.g., an event created for publicity, etc.); and a party (e.g., a large social or recreational gathering, etc.). In short, an event can be any data associated with servicing a user's requests by an intelli-interface 199.

For one embodiment of the context graph 175, the edges between nodes represent relationships or correlations between the nodes. More specifically, a relationship or correlation between two contexts (which are represented as nodes) could be data (e.g., acquired data 170, predicted data 170, an event, etc.) that is common to both contexts. For one embodiment, the intelli-interface 199 uses the "hard data" to generate correlations or relationships between nodes (e.g., by generating a new edge between a pair of contexts represented as nodes in the graph 175, etc.). For a further embodiment, the intelli-interface 199 uses the "soft data" to augment the generated correlations or relationships between nodes (e.g., by weighting previously generated edges between a pair of contexts represented as nodes in the graph 175, etc.). For a first example, a first context could be all persons that User A worked with at Company B, while a second context could be all persons User A has known for over ten years. For this first example, the two contexts could be correlated with each other using "hard data" when one or more of the persons in the first context overlap with one or more persons in the second context. For a second example, a first context could be all persons that User A worked with at Company C in the year 2010, while a second context could be all persons that went to university with User A during the years of 2005-2009. For this second example, a previously determined correlation between User A and a person that went to University with User A may be weighted (to show a stronger correlation between User A and the person) using "soft data." The soft data, in this second example, could be data that indicating a person that went to school with User A and graduated with the same degree as User A more likely than not ended up working for Company C.

The architecture 100 can include memory/data stores 160 for storing and/or retrieving acquired data 170, predicted data 180, and/or context network 175. Memory/data stores 160 can include any type of memory known (e.g., volatile memory, non-volatile memory, etc.). Each of data 170, 180, and 175 can be generated, processed, and/or captured by the other components in the architecture 100. For example, the acquired data 170, the predicted data 180, and/or the context network 175 includes data generated by, captured by, processed by, or associated with one or more peripherals 190, the provider(s)/device(s) 120, the service(s) 150, the sensor(s) 191, the processing unit(s) 130, etc. The architecture 100 can also include a memory controller (not shown), which includes at least one electronic circuit that manages data flowing to and/or from the memory 160. The memory controller can be a separate processing unit or integrated in processing unit(s) 130.

The architecture 100 can include $3^{rd}$ party service provider(s) and/or communication device(s) 120 (hereinafter "provider(s)/device(s) 120"). The provider(s)/device(s) 120 is illustrated with a dashed box to show that it is an optional component of the architecture 100. Nevertheless, the provider(s)/device(s) 120 is not always an optional component of the architecture 100—some embodiments of the architecture 100 may require the provider(s)/device(s) 120. For one embodiment, the provider(s)/device(s) 120 include any number of computing devices that enable an end user to request one or more $3^{rd}$ party services via communication mechanism(s) 110. The provider(s)/device(s) 120 can, for example, include email servers such as a GOOGLE® or YAHOO!® email server (GOOGLE is a registered service mark of Google Inc. YAHOO! is a registered service mark of Yahoo! Inc.), third party instant message servers such as a YAHOO!® Messenger or AOL® Instant Messaging server (AOL is a registered service mark of AOL Inc.), third party social network servers such as a FACEBOOK® or TWITTER® server (FACEBOOK is a registered trademark of Facebook, Inc. TWITTER is a registered service mark of Twitter, Inc.), cellular service provider servers that enable the sending and receiving of messages such as email messages, short message service (SMS) text messages, multimedia message service (MMS) messages, or any other device that enables individuals to communicate using any protocol and/or format.

The architecture 100 can also include peripheral(s) 190. For one embodiment, the peripheral(s) 190 can include at least one of the following: (i) one or more input devices that interact with or send data to one or more components in the architecture 100 (e.g., mouse, keyboards, touch screen devices, gesture input devices, audio input devices, etc.); (ii) one or more output devices that provide output from one or more components in the architecture 100 (e.g., monitors, printers, display devices, haptic output devices, audio output devices, etc.); or (iii) one or more storage devices that store data in addition to the memory 160. Peripheral(s) 190 is illustrated with a dashed box to show that it is an optional component of the architecture 100. Nevertheless, the peripheral(s) 190 is not always an optional component of the architecture 100—some embodiments of the architecture 100 may require the peripheral(s) 190 (e.g., a smartphone with media recording and playback capabilities, etc.). The peripheral(s) 190 may also refer to a single component or device that can be used both as an input and output device (e.g., a touch screen, etc.). The architecture 100 may include at least one peripheral control circuit (not shown) for the peripheral(s) 190. The peripheral control circuit can be a controller (e.g., a chip, an expansion card, or a stand-alone device, etc.) that interfaces with and is used to direct operation(s) performed by the peripheral(s) 190. The peripheral(s) controller can be a separate processing unit or integrated in processing unit(s) 130. The peripheral(s) 190 can also be referred to as input/output (I/O) devices 190 throughout this document.

The architecture 100 can also include one or more sensors 191, which are illustrated with a dashed box to show that the sensor(s) can be optional components of the architecture 100. Nevertheless, the sensor(s) 191 are not always optional components of the architecture 100—some embodiments of the architecture 100 may require the sensor(s) 191 (e.g., a camera that includes an imaging sensor, a microphone, an accelerometer, a global positioning system (GPS), etc.). For one embodiment, the sensor(s) 191 can detect a characteristic of one or more environs. Examples of a sensor include, but are not limited to, a light sensor, an imaging sensor, an accelerometer, a location sensor, a sound sensor, a barometric sensor, a proximity sensor, a vibration sensor, a gyroscopic sensor, a compass, a barometer, a heat sensor, a rotation sensor, a velocity sensor, and an inclinometer.

The architecture 100 can include network-connected devices 193, which may include any number of hardware devices that communicate via any of the computer mechanism(s) 110 and are capable of being controlled via network communication. Examples of devices 193 include, but are not limited to, IoT devices, laptop computers, desktop computers, wearables, servers, vehicles, and any type of programmable device or computing system.

For one embodiment, the architecture 100 includes communication mechanism(s) 110. The communication mechanism(s) 110 can include a bus, a network, or a switch. When the mechanism(s) 110 includes a bus, the mechanism(s) 110 include a communication system that transfers data between components in architecture 100, or between components in architecture 100 and other components associated with other systems (not shown). As a bus, the mechanism(s) 110 includes all related hardware components (wire, optical fiber, etc.) and/or software, including communication protocols. For one embodiment, the mechanism(s) 110 can include an internal bus and/or an external bus. Moreover, the mechanism(s) 110 can include a control bus, an address bus, and/or a data bus for communications associated with the architecture 100. For one embodiment, the mechanism(s) 110 can be a network or a switch. As a network, the mechanism(s) 110 may be any network such as a local area network (LAN), a wide area network (WAN) such as the Internet, a fiber network, a storage network, or a combination thereof, wired or wireless. When the mechanism(s) 110 is a network, the components in the architecture 100 do not have to be physically co-located. When the mechanism(s) 110 is a switch (e.g., a "cross-bar" switch), separate components in architecture 100 may be linked directly over a network even though these components may not be physically located next to each other. For example, two or more of the processing unit(s) 130, the communication mechanism(s) 110, the memory 160, the peripheral(s) 190, the sensor(s) 191, and the provider(s)/device(s) 120 are in distinct physical locations from each other and are communicatively coupled via the communication mechanism(s) 110, which is a network or a switch that directly links these components over a network.

Referring again to the intelli-interface 199 of architecture 100, which can receive and resolve multiple user requests unlike some conventional interactive interfaces that operate in a restrictive one-purpose-one-action manner. For brevity, this disclosure will refer to multiple user requests as a first user request and a second user request. It is to be appreciated that multiple user requests includes two or more user requests.

For one embodiment, resolution of the first and/or second user requests includes proactive suggestion of information as well as reactive responses based on knowledge understanding. For example, and for one embodiment, the intelli-interface 199 (via the interactive interface module/logic 140) receives a first user request and a second user request. For one embodiment, none of the first and second user requests is resolved prior to receipt of any other request. In response to receiving the requests, the intelli-interface 199 determines a current context associated with each of the first and second requests. Here, the intelli-interface 199 traverses the context graph 175 to determine whether a current context exists for each of the first and second user requests. Alternatively, or additionally, the intelli-interface 199 can create a current context for one or more of the first and second user requests in the context graph 175. For example, in response to determining that there is no current context associated with the first user request, the intelli-interface 199 can create a current context for the first user request in the context graph 175.

The determined context for each of the first and second user requests is a current context or an open context, as described above. For simplicity, the following description of a current context will focus on the first user request. It is to be appreciated that the actions performed with respect to the first user request are also applicable to the second user request. That is, resolution of the first and second user requests can occur in parallel. Alternatively, resolution of the first and second user requests can occur in sequentially. For at least one embodiment, the two requests may be dependent on each other such that resolution of one of the two requests requires resolution of the other request.

Referring again to the immediately preceding example, when the intelli-interface 199 determines a current context for the first user request in the context graph 175, then the intelli-interface 199 may determine all other contexts (i.e., current and/or previous contexts) associated with the identified current context for the first user request. These determination operations can be achieved using the correlations (i.e., edges within the context graph 175) between the identified context (i.e., a node in the context graph 175) and other related contexts (i.e., other correlated nodes in the context graph 175). Next, the intelli-interface 199 monitors the contexts until resolution of the first user request is possible. When the request is satisfied, all contexts associated with the first user request are deemed by the intelli-interface 199 to be previous contexts and are stored in the memory/data stores 160.

Figure 2:
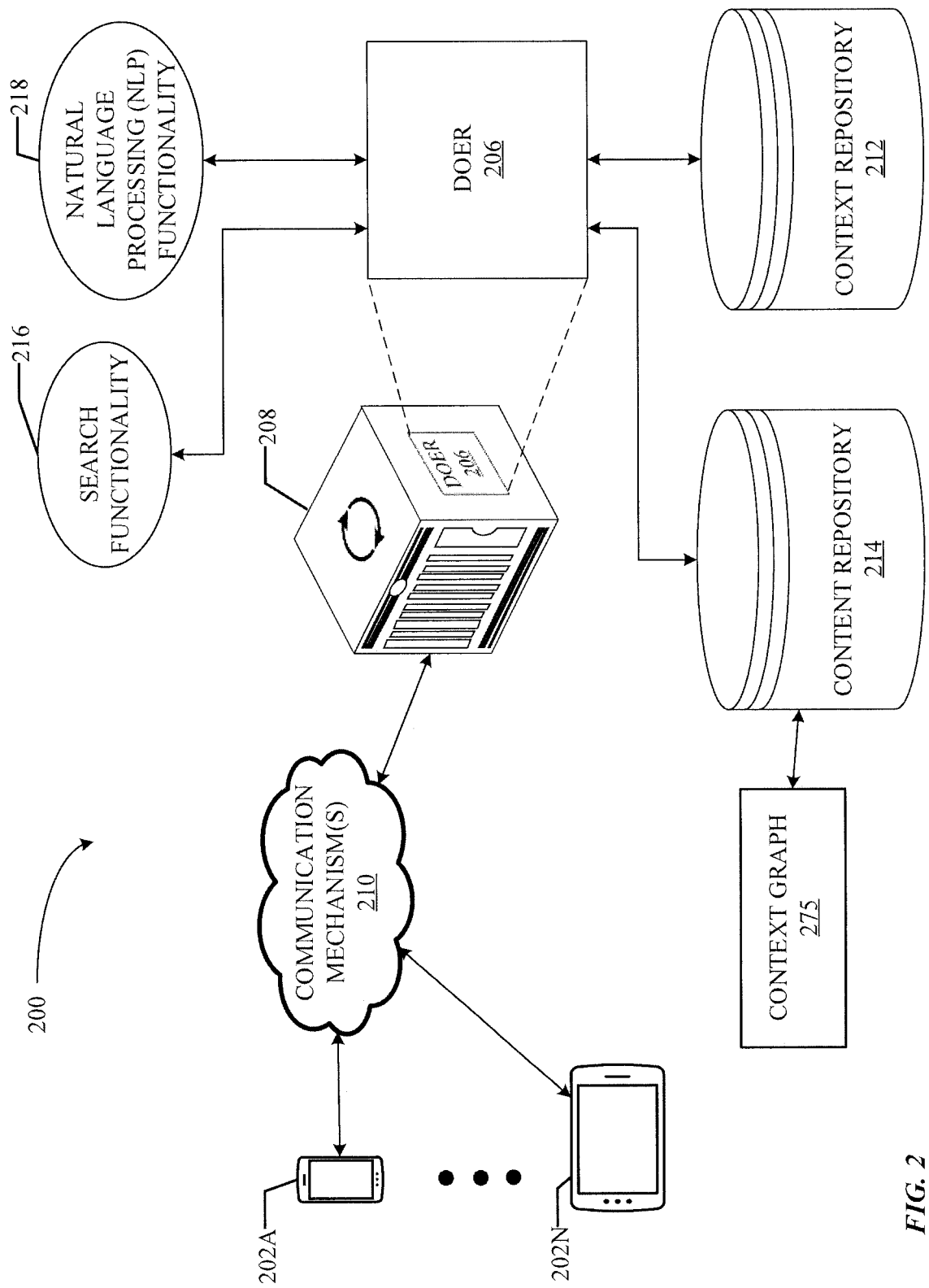
FIG. 2 illustrates an exemplary central communications server infrastructure, according to one or more embodiments disclosed herein. The infrastructure in FIG. 2 can be part of an intelli-interface as described herein.

FIG. 2 illustrates an exemplary central communications server infrastructure 200, according to one or more embodiments disclosed herein. The infrastructure 200 may be part of the infrastructure 100. For example, the infrastructure 200 may be part of one or more of the interface 199 and the memory 160, as described above in connection with FIG. 1.

According to some embodiments, the central communications server infrastructure 200 may be responsible for storing, indexing, managing, searching, relating, and/or retrieving content (including communications messages and data files of all types) for the various users of the communication system. The exemplary infrastructure 200 may be accessed by any of the devices 202A-N. For example, and for one embodiment, the infrastructure 200 can be accessed by any of the devices 202A-N that includes the interactive interface logic/module 140 and/or the service(s) 150, as described above in connection with FIG. 1.

Access to the infrastructure 200 can be via one or more communication mechanism(s) 210, which are similar to the mechanism(s) 110 of FIG. 1 (described above). For one embodiment, the communication mechanism(s) 210 include many different types of computer networks available today, such as the Internet, a corporate network, a Local Area Network (LAN), or any other known communication network. Each of these networks can contain wired or wireless devices and operate using any number of network protocols (e.g., TCP/IP). The communication mechanism(s) 210 may be connected to various gateways and routers, connecting various machines to one another, represented, e.g., by central communications server 208, and various end user devices, including devices 202A-N (e.g., a mobile phone, a laptop computer, a tablet, a wearable, an IoT device, a programmable device, a vehicle, a server, etc.).

For one embodiment, the infrastructure 200 includes a central communications server 208. The server 208, in connection with one or more databases, repositories, subsystems, Application Programming Interfaces (APIs), etc., may serve as the central "brain" for the embodiments described herein. In particular, a "Doer" 206 may be implemented as an activity manager program running on the central communications server that takes the various actions that the communications server 208 determines need to be performed, e.g., sending a message, storing a message, storing content, tagging content, indexing content, storing and relating contexts, etc. For one embodiment, the Doer 206 can comprise one or more of a program, a thread, an activity manager, or any software/hardware component capable of implementing one or more actions as described herein.

For some embodiments, data may be classified and stored, at various levels of detail and granularity, in what is known as "contexts." The contexts may be stored in a context repository 212, which is accessible by Doer 206. Context repository 212 may be implemented as a running activity log, i.e., a running list of all relevant "things" that have happened, either directly or indirectly, to a given user via their use of the communications system.

For some embodiments, the Doer 206 is responsible for characterizing, relating, and tagging all information that gets stored in the context repository 212. The various contexts and their relationships to other contexts may inform the system (and thus, the Doer 206) as to actions that should be taken (or suggested) to a user when that user faces a certain situation or scenario (i.e., when the user is in a certain context). For example, if the context repository 212 has stored a context that relates to a user's search for "cars," the next time the user is near a car dealership that sells cars of the type that the user had been searching for, the infrastructure 200 may offer the user a notification that cars he has shown interest in are being offered for sale nearby or even present the search results from the last time the user searched for those cars. For some embodiments, the context repository 212 may employ probabilistic computations to determine what actions, things, events, etc. are likely to be related to one another.

For some embodiments, the Doer 206 is also in communication with a content repository 214. Unlike the context repository 212, which is effectively a log of all stored activities, the content repository 214 may be implemented as a unique (i.e., per-user) repository of all content related to a given user. The design of a particular user's context repository 212 may, for example, be based on the user's patterns of behavior and communication and several other parameters relating to the user's preferences. Such patterns and parameters may take into account, e.g., who a user communicates with, where those parties are located, what smart devices and/or other connected services a user interacts with, etc. Because the design and makeup of the content repository 214 is a unique (i.e., per-user) structure that is driven by each individual's personal interactions with the communication system, the system scales on a per-user basis, rather than on a per-network basis, as in traditional distributed systems or social graphs involving characteristics of multiple inter-related users.

In summary, the content repository 214 orchestrates and decides on behaviors for the system to take on behalf of a user (e.g., "the system should open an email message to Dave about cars."); the Doer 206 actually implements or affects those decision to happen (e.g., directing the communication system's user interface to open an email message window, pre-populate the To: field of the email message with Dave's contact information, pre-populate the Subject: field of the email message with "Cars," etc.); and the context repository 212 tracks all pieces of data that may related to this particular task (e.g., search for Dave's contact info, search for cars, compose a message to Dave, compose a message about cars, use Dave's email address to communicate with him, etc.).

The Doer 206 may also leverage various functionalities provided by the central communication system, such as a multi-protocol, multi-format search functionality 216 that, e.g., is capable of searching across some or all of a user's contexts, messages, and content, or across the Internet to provide relevant search results to a task that the user is currently trying to accomplish. The Doer 206 may also, e.g., leverage a Natural Language Processing (NLP) functionality 218 that is capable of intelligently analyzing and interpreting spoken or written textual commands for content, semantic meaning, emotional character, etc. With the knowledge gained from NLP functionality 218, the central communications server may, e.g., be able to suggest more appropriate responses, give more appropriate search results, suggest more appropriate communications formats and/or protocols, etc. In some embodiments, the Doer 206 may also synchronize data between the context repository 212 and the various sub-systems (e.g. search system 216 or NLP system 218), so that the context repository 212 may constantly be improving its understanding of which stored contexts may be relevant to the contexts that the user is now participating in (or may in the future participate in).

For one embodiment, the Doer 206 communicates with a context graph 275 (that is similar to or the same as the context graph 175 described above in connection with FIG. 1) together with the repositories 212, 214 and the functionalities 216, 218 to service multiple user requests that are associated with a user account. At least one example of servicing multiple requests is described above in connection with FIG. 1.

Figure 3:
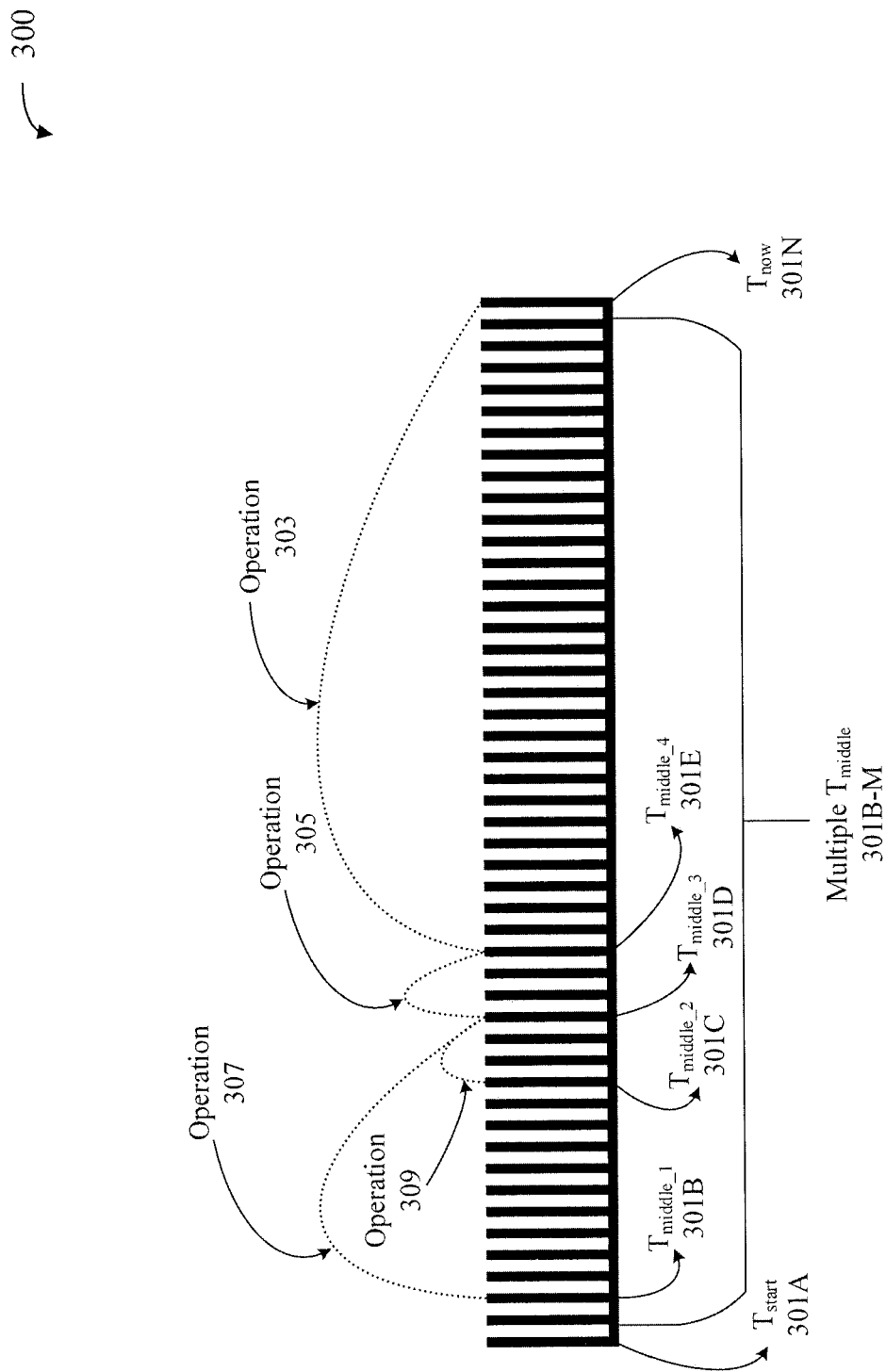
FIG. 3 illustrates a two-dimensional ("2D") graphical approximation of a multi-dimensional context management graph ("context graph") in accordance with one or more embodiments. The context graph in FIG. 3 can be similar to or the same as any of the context graphs described in connection with FIGS. 1-2.

FIG. 3 illustrates a two-dimensional (2D) graphical approximation of a multi-dimensional context graph 300 in accordance with one or more embodiments. The graph 300 can be similar to or the same as the graph 175 or the graph 275, each of which is described above in FIGS. 1-2.

The 2D graphical approximation of the context graph 300 is used to show how an intelli-interface (e.g., the intelli-interface 199 of FIG. 1, etc.) identifies related contexts for the purpose of servicing user requests. For one embodiment, the 2D graphical approximation of graph 300 is illustrated in FIG. 3 temporally in order to avoid obscuring the inventive concepts described herein. It is to be appreciated that, as a knowledge based system of a neural network, the context graph 300 may be comprise one or more networks that are organized in layers. Here, each layer may be made up of a number of interconnected nodes (i.e., contexts) which contain an activation function. Patterns are presented to the context graph 300 via an input layer, which communicates to one or more hidden layers where the actual processing is done via a system of weighted connections. The hidden layers then link to an output layer where the answer is output. In the context of an intelli-interface as described herein, the patterns presented via an input layer represent the user requests to be resolved, the hidden layer includes algorithms, mechanisms, and other components used to traverse the context graph (e.g., graph 175, 275, etc.) to determine connections between nodes, and the output layer represents the action performed by a Doer, for example, to service a user request.

Referring again to FIG. 3, the 2D graphical approximation of the context graph 300 shows a plurality of contexts associated with a user account over a predetermined period of time that begins sometime in the past at $T_{start}$ 301A and ends at the current time $T_{now}$ 301N. As shown in FIG. 3, the time between $T_{start}$ 301A and $T_{now}$ 301N includes multiple time designations $T_{middle}$ 301B-M. For one embodiment, each of the times 301A-N corresponds to a context. Furthermore, each of the contexts has a unique context identifier ("context ID"). Thus, $T_{start}$ 301A corresponds to a context with its unique context ID, each of $T_{middle}$ 301B-M corresponds to a context with its unique context ID, and $T_{now}$ 301N corresponds to a context with its unique context ID. Each of the contexts associated with $T_{start}$ 301A, $T_{now}$ 301N, and $T_{middle}$ 301B-M may be an open or closed context. For a specific embodiment, the context associated with $T_{now}$ 301N is an open context, while each of the contexts associated with $T_{now}$ 301N and $T_{middle}$ 301B-M is an open context or a closed context.

In response to an intelli-interface receiving a user request at or near the current time $T_{now}$ 301N, the intelli-interface may identify a context 301N at the present time. Furthermore, the intelli-interface can determine contexts from the past (i.e., $T_{start}$ 301A and $T_{middle}$ 301B-M) that are related to the context associated with the $T_{now}$ 301N. As explained above, these relationships are used for servicing the user request. For an embodiment, determining the related contexts includes operations 303-309. One advantage of intelli-interface is its ability to assist with providing a much richer array of connected events via the context graph, which can be used to train a system (e.g., a neural network, etc.) to handle ambiguity and prediction. In other words, in order to better predict in the future, an intelli-interface can allow for understanding one or more past events via a context graph. Critical to understanding past event, is not just connecting current events via current contexts to past events via previous contexts, but to infuse that information into the contexts identifying past events in a context graph such that the intelli-interface can continually re-process and re-train with improved knowledge. An example of this is: a user performs an action X, for a reason which an intelli-interface cannot ascertain from the context graph. A year later, the intelli-interface learns via the context graph that the user had a child and the reason for doing action X was to improve the child's life. For this example, the intelli-interface can now take that information and infuse that back into the data for Action X that exists in the context graph so that resolving user requests associated with Action X or the user's child can be resolved intelligently regardless of any ambiguity or incomplete/missing data about contexts. In this way, an intelli-interface can learn from new knowledge about past events to improve judgement (i.e., resolution of one or more user events).

With regard to operation 303, an intelli-interface can determine that a context associated with $T_{now}$ 301N is related to a context associated with $T_{middle\_4}$ 301E. Here, the determination can be based on the two contexts having at least some data (e.g., acquired data, predicted data, at least one event, etc.) in common. For example, if the context corresponding to $T_{now}$ 301N includes a user request for bookstores, and the context corresponding to $T_{middle\_4}$ 301E includes group of bookstores spatially located within five miles of User A's home, then an intelli-interface can determine that the context associated with $T_{now}$ 301N is related to the context associated with $T_{middle\_4}$ 301E. By the same rationale, an intelli-interface can determine that the contexts associated with operations 305-309 are related to the context corresponding to $T_{now}$ 301N. Here, each of the contexts associated with operations 305-309 includes some information about bookstores. For example, the context associated with operation 305 includes information about bookstores that are spatially within 10 miles of User A's current location, the context associated with operation 307 includes information about bookstores that were previously visited by User A, and the context associated with operation 309 includes information about bookstores that are spatially close to other locations frequented by User A. As shown in FIG. 3, contexts can be directly or indirectly correlated with each other. Contexts are directly related to each other when there is no intervening context between them, and contexts are indirectly related to each other when there is at least one intervening context between them. For example, the context associated with 301N is directly related to the context associated with $T_{middle\_4}$ 301E and indirectly related to the contexts associated with $T_{middle\_3}$ 301D, $T_{middle\_2}$ 301C, and $T_{middle\_1}$ 301B.

Each of the contexts associated with the times 301-N can be a macro-context or a micro-context. For an embodiment, macro-contexts may temporally occur before micro-context. For one or more embodiments, micro-contexts may temporally occur before macro-context.

Figure 4:
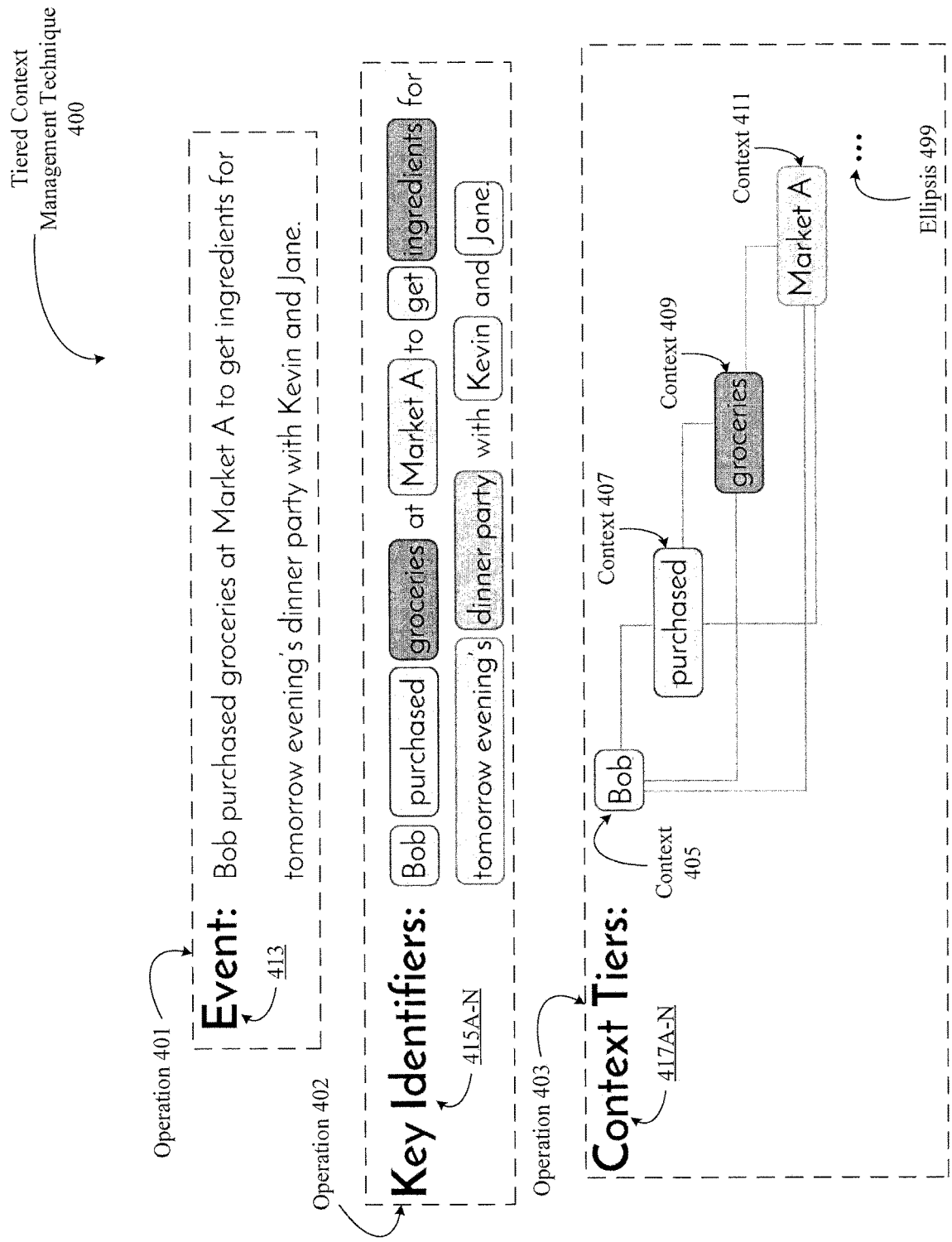
FIG. 4 illustrates a tiered context management technique in accordance with one or more embodiments.

FIG. 4 illustrates a tiered context management technique 400 in accordance with one or more embodiments. The technique 400 can be performed by an intelli-interface (e.g., the intelli-interface 199 described above in connection with FIG. 1, etc.). Technique 400 begins at operation 401, where an event 413 is received by an intelli-interface. The event 413 can be any activity associated with a user (e.g., user Bob shown in FIG. 4, etc.). For one embodiment, the intelli-interface receives the event 413 at operation 401 as a statement or a request. For one embodiment, the event 413 can be provided to the intelli-interface via user inputs (as a user request) or may be contextually determined (as a statement) based on inputs from sensors and/or predicted or forecasted behavior associated with user Bob. For one embodiment, operation 401 may include the intelli-interface pre-processing the event 413 to convert the event 413 into a format that is usable by the intelli-interface. For example, the intelli-interface can format the event 413 into a data structure that is similar to the data structure used for organizing a user's contexts in a context graph.

Technique 400 proceeds to operation 402. Here, the intelli-interface can process the event 413 to determine one or more key identifiers 415A-N associated with the event 413. These key identifiers can be parsed and ascertained via natural language principles and/or machine learning techniques implemented by the intelli-interface. As shown in FIG. 4, the key identifiers 415A-N are encompassed by the rounded squares.

Next, technique 400 proceeds to operation 403. Here, the intelli-interface determines whether one or more of the key identifiers 415A-N is associated with a context. For example, each of the key identifiers 415A-N may be associated with a context that is represented as a node in a context graph, such that identification of the key identifier triggers identification of the corresponding context 417A-N within the context graph. For a first example, and for one embodiment, the key identifier "Bob" can trigger identification of a context 405 associated with all activities performed by the user Bob in a context graph. For a second example, and for one embodiment, the key identifier "purchased" can trigger identification of a context 407 associated with all activities associated with purchasing items and/or services performed by the user Bob in the context graph. For a third example, and for one embodiment, the key identifier "groceries" can trigger identification of a context 409 associated with all activities associated with purchasing or selling groceries performed by the user Bob in the context graph. For a fourth example, and for one embodiment, the key identifier "Market A" can trigger identification of a context 411 associated with all activities associated with user Bob's physical and/or virtual interactions with Market A in the context graph.

For one embodiment, the intelli-interface organizes the identified contexts 405, 407, 409, and 411 into a hierarchical context tier based on relative granularity levels of the contexts when compared to each other. Here, the intelli-interface can cache the at least some of the identified contexts and/or the generated context tier to retrieve or access the information without having traverse the context graph. This can, in some embodiments, assist with efficient utilization of computing resources and improve the accuracy associated with proper resolution of user requests. This can also assist with intelligently responding to user requests in a more efficient and accurate manner than was previously available to restrictive one-purpose-one-action type interactive interfaces. For example, and as illustrated in FIG. 4, the intelli-interface can arrange the identified contexts in a tier such that the contexts are traversed in a sequential order. Conceptually, a context tier will include the more narrowly defined micro-contexts being stacked on top of the more broadly defined macro-contexts. As shown, the foundation tier is context 405, which includes all activities associated with user Bob. The penultimate level is the context 407, which includes all purchase activities associated with user Bob. The level above the penultimate level is context 409, which includes all purchase activities associated with groceries as those activities relate to user Bob. The top-most level is context 411, which includes all purchases activities performed by user Bob in Market A. The ellipsis 499 in FIG. 4 shows that the intelli-interface can arrange any number of the contexts associated with the event 413 into a context tier.

For some embodiments, the context tier is not hierarchical. That is each context is related to all other contexts.

Figure 5:
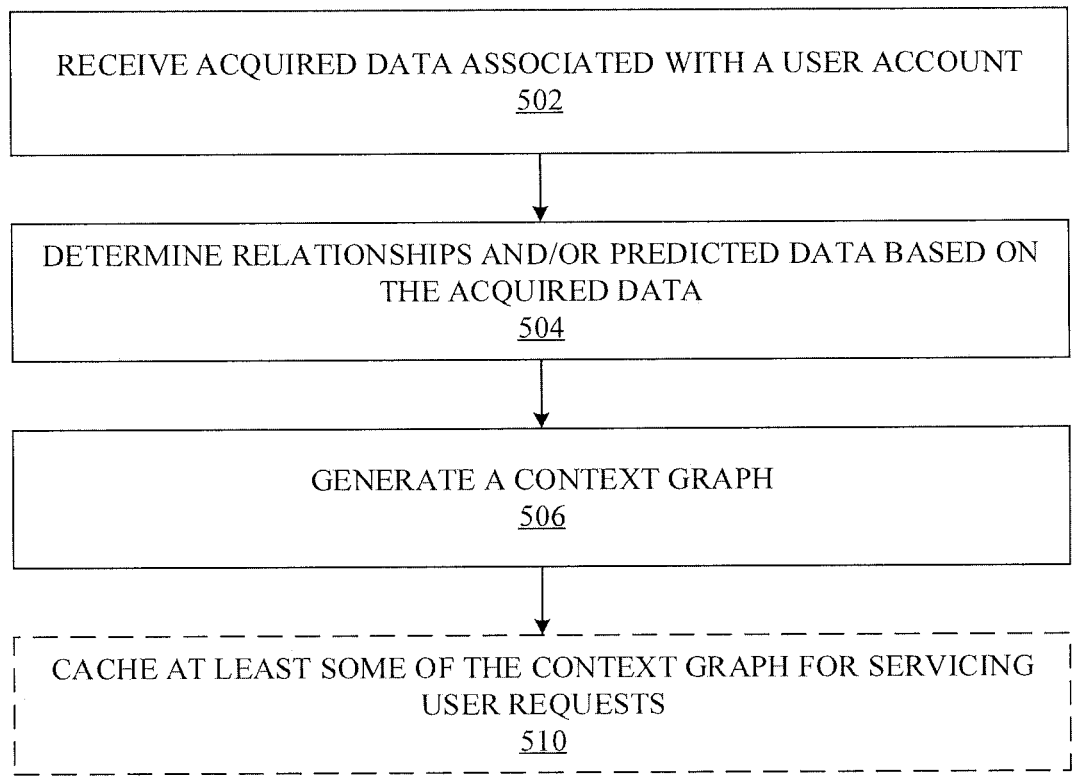
FIG. 5 illustrates, in flowchart form, a technique to generate an exemplary multi-dimensional context graph in accordance with an embodiment.

FIG. 5 illustrates, in flowchart form, a technique 500 to generate an exemplary context graph in accordance with an embodiment. Technique 500 can be performed by an intelli-interface (e.g., the intelli-interface 199, etc.). For one embodiment, technique 500 begins at operation 502, where acquired data associated with a user account is received by an intelli-interface. Acquired data is described above in connection with at least FIG. 1. Next, technique 500 moves to operation 504. Here, the intelli-interface processes the acquired data using data mining, data analytics, and/or machine learning techniques to determine relationships and/or predicted data based on the acquired data. Relationships and predicted data are described above in connection with at least FIG. 1. At operation 506, the intelli-interface performing technique 500 generates a context graph using the acquired data, the determined relationships, and/or the determined predicted data. For some embodiments of technique 500, the intelli-interface can optionally cache some of the data in the context graph for servicing user requests. For example, at least some of the context graph can be cached in memory associated with an intelli-interface (e.g., memory of a device that includes the interactive interface logic/module 140 of FIG. 1, memory of a device that includes the interactive interface service(s) 150 of FIG. 1, memory/data stores 160 of FIG. 1, etc.).

Figure 6:
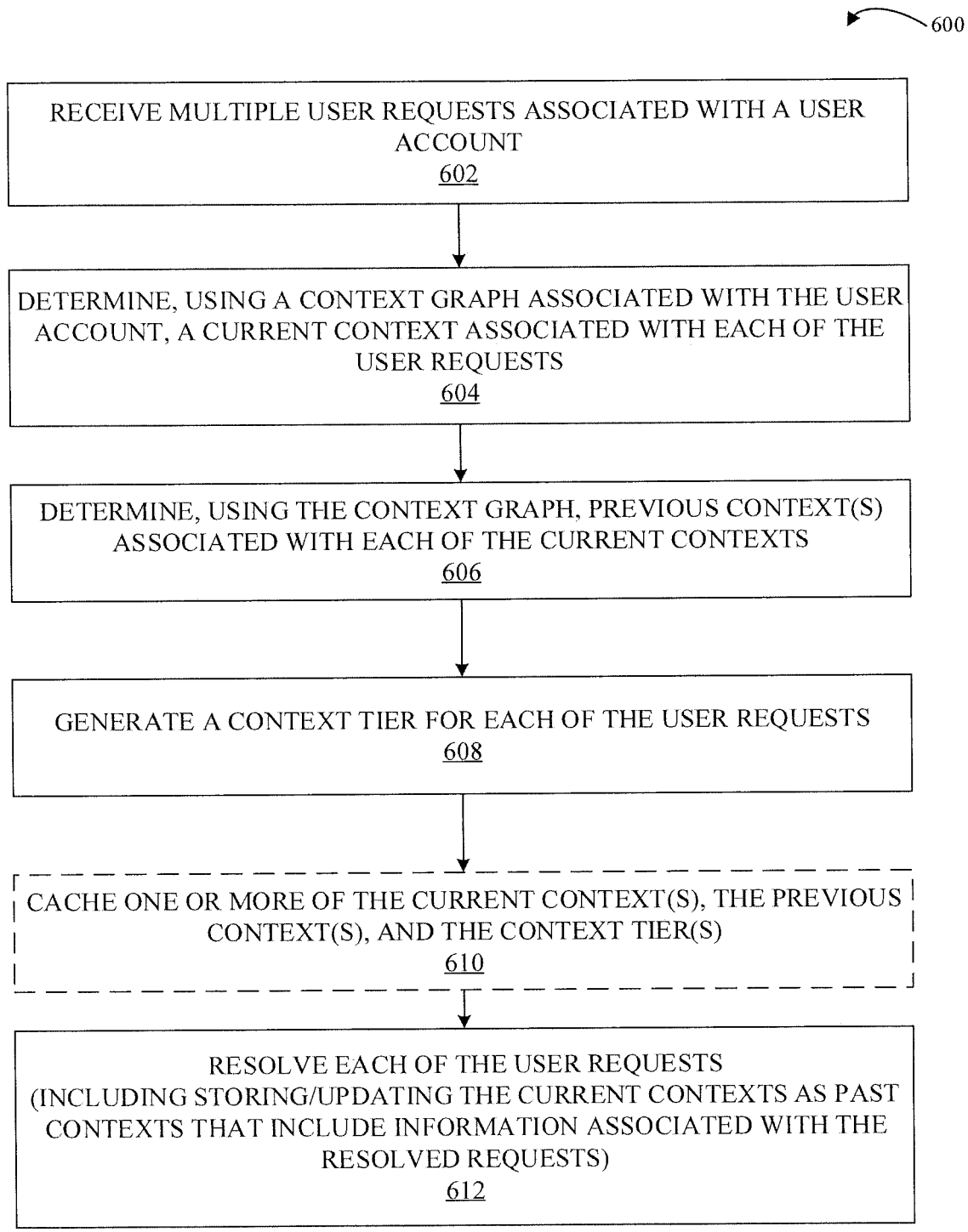
FIG. 6 illustrates, in flowchart form, a technique to service multiple user requests associated with a user account by an intelli-interface in accordance with an embodiment.

FIG. 6 illustrates, in flowchart form, a technique 600 to service multiple user requests associated with a user account by an intelli-interface in accordance with an embodiment. Technique 600 can be performed by an intelli-interface (e.g., the intelli-interface 199, etc.). Technique 600 begins at operation 602 when an intelli-interface receives multiple user requests from a user account. For one embodiment, each of these requests is unrelated to each other such that resolution of one of the requests does not affect resolution of the other. For example, a first request can be to "send John Doe an email" and a second request can be to "schedule a ride to the airport for me tomorrow at 2:30 P.M." For an alternate embodiment, each of these requests is dependent on each other such that resolution of one of the requests cannot be performed without resolution of at least one of the other requests. For example, a first request can be to "send John Doe an email with document X" and a second request can be to "send an email to Jane Doe with an updated version of document X after John Doe responds to my email." For one embodiment, operation 602 includes the intelli-interface storing each received request.

Next, at operation 604, the intelli-interface determines a current context associated with each of the user requests. For example, the intelli-interface determines whether a current context already exists for any of the newly received requests or whether a new context needs to be created for servicing the user request. Operation 605 is performed by the intelli-interface traversing the context graph (e.g., graph 175, 200, 300, etc.) to determine whether the current context exists. If the current context exists in the graph, then technique 500 proceeds to operation 606. On the other hand, if the current context fails to exist in the context graph, then the intelli-interface generates the current context in the context graph. For one embodiment, the interactive interface logic/module 140 that resides on the device associated with the user account (i.e., the device that receives the requests) determines the current context and transmits the determined current context to a context graph residing in the intelli-interface service(s) 150 for further processing.

Technique 600 proceeds to operation 606. Here, the intelli-interface receives the determined current context and further determines previous contexts within the context graph that are related to the current context. For one embodiment, the service(s) 150 perform the determination or previous contexts. Determining relationships between contexts is described above in connection with at least FIG. 3. Next, at operation 608, the intelli-interface generates a context tier for each of the user requests. Context tiers are described above in connection with at least FIG. 4. Optionally, and as shown in operation 610, each of contexts that make up a context tier are cached to enable improved retrieval and use of the contexts. Consequently, the cache can assist with a more efficient utilization of computational resources than was previously available. For one embodiment, the cache can reside in one or more of the processing unit(s) 130, the servers 151A-N, the memory/data store(s) 160, the network-connected device(s) 193, the 3$^{rd}$ party service provider(s)/device(s) 120, the sensor(s) 191, and the peripheral(s) 190. Each of these components is described above in connection with FIG. 1.

Referring again to FIG. 6, technique 600 proceeds to operation 612. Here, the intelli-interface resolves each of the multiple user requests based on its determined context tier. This operation also includes, for each request, storing or updating the current context in the context graph as a previous (i.e., closed) context that includes information about the resolved user request. For a first example, if a first request is to "send John Doe an email" and a second request is to "schedule a ride to the airport for me tomorrow at 2:30 P.M.," the intelli-interface can perform technique 600 to resolve each of these requests. As will be appreciated, these requests can be resolved independently of each other. For this example, the intelli-interface will also update the current context in the context graph by converting the current context (i.e., an open context) into a previous context with information about the resolved request (i.e., a closed context). In this way, the intelli-interface updates the context graph, as user requests are resolved. For a second example, if a first request is to "send John Doe an email with document X" and a second request is to "send an email to Jane Doe with an updated version of document X after John Doe responds to my email," the intelli-interface can perform technique 600 to resolve each of these requests. As will be appreciated, these requests cannot be resolved independently of each other because resolution of the second request depends on resolution of the first request. Consequently, for this example, the intelli-interface will maintain two current contexts (i.e., open contexts) for the requests. After the intelli-interface resolves the first request of this second example and updates its status in the context graph, then the intelli-interface can resolve the second request and update its status in the context graph.

For one embodiment, and with regard to the two examples above, each of the first and/or second requests can be maintained as a current context (i.e., an open context) for as long as is necessary (e.g., seconds, minutes, hours, years, decades, etc.) until resolution. For a further embodiment, the interactive interface can request confirmation from the user to complete one or more of the multiple requests when a predetermined amount of time has elapsed after receiving the requests.

Figure 7A:
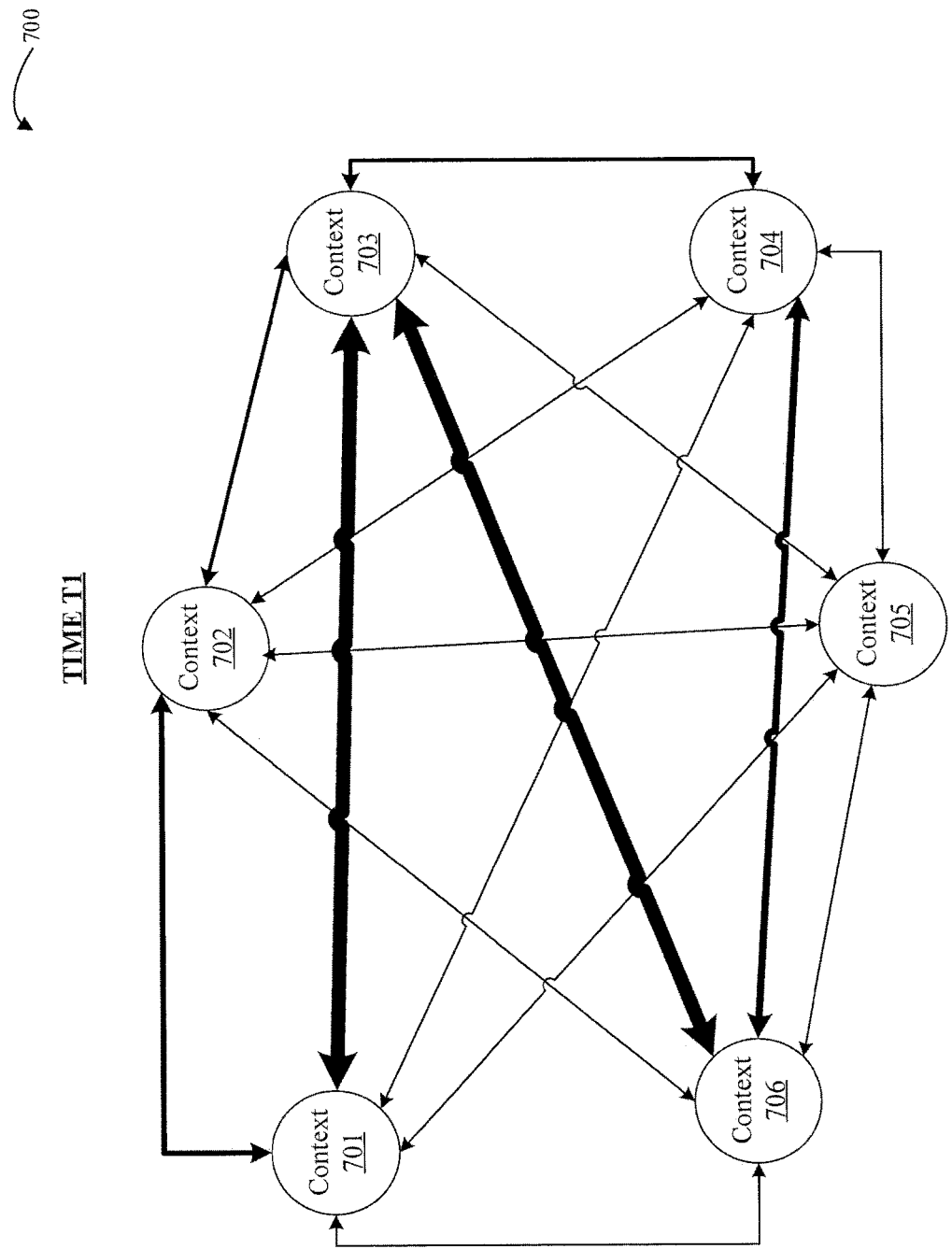
FIGS. 7A-7C illustrate, in block diagram form, a 2D graphical approximation of an exemplary multi-dimensional context graph comprising a cluster of contexts ("context cluster") in accordance with one embodiment. The exemplary context graph illustrated in FIGS. 7A-7C can be generated and/or used by the embodiments of an intelli-interface described herein.
Figure 7B:
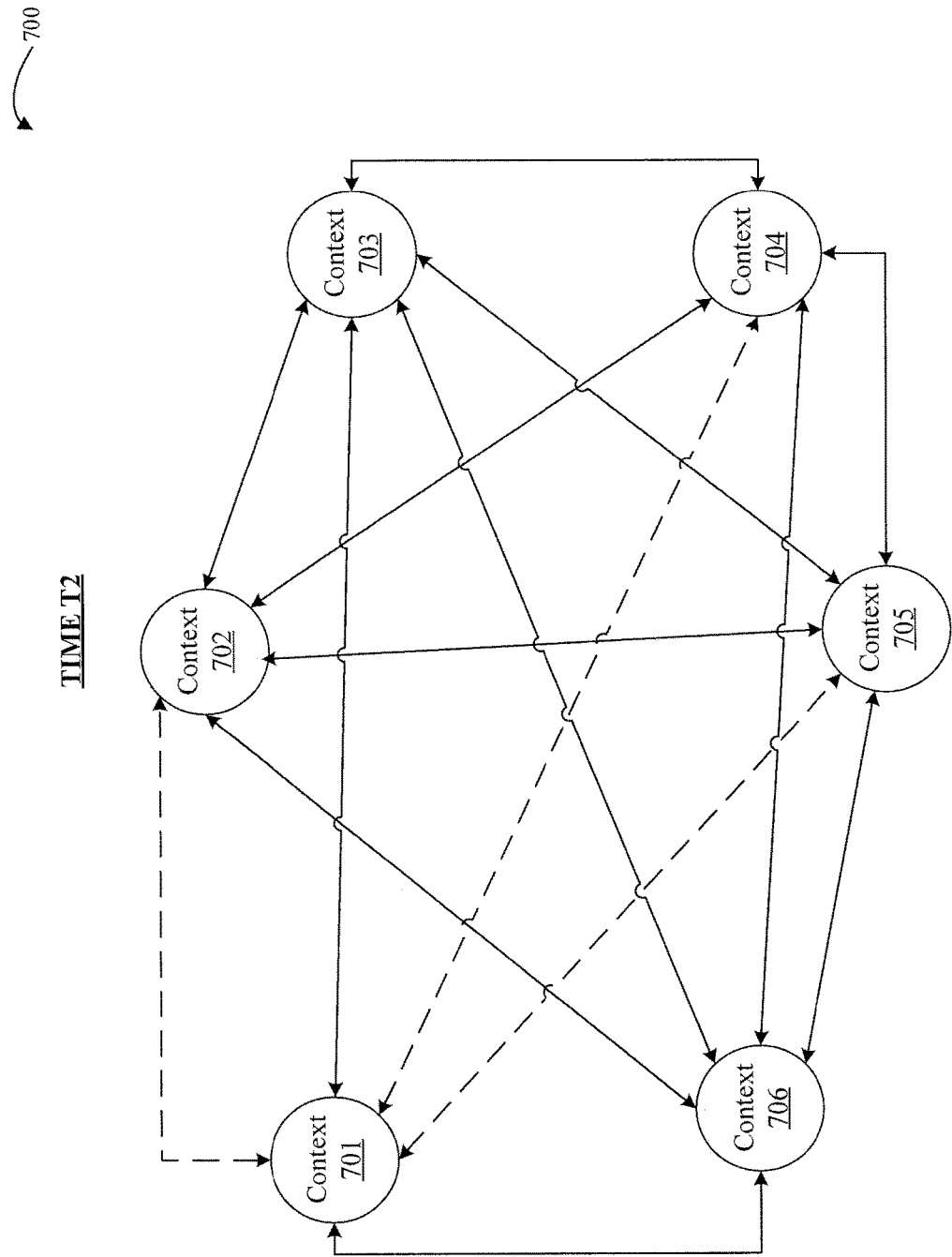
Figure 7C:
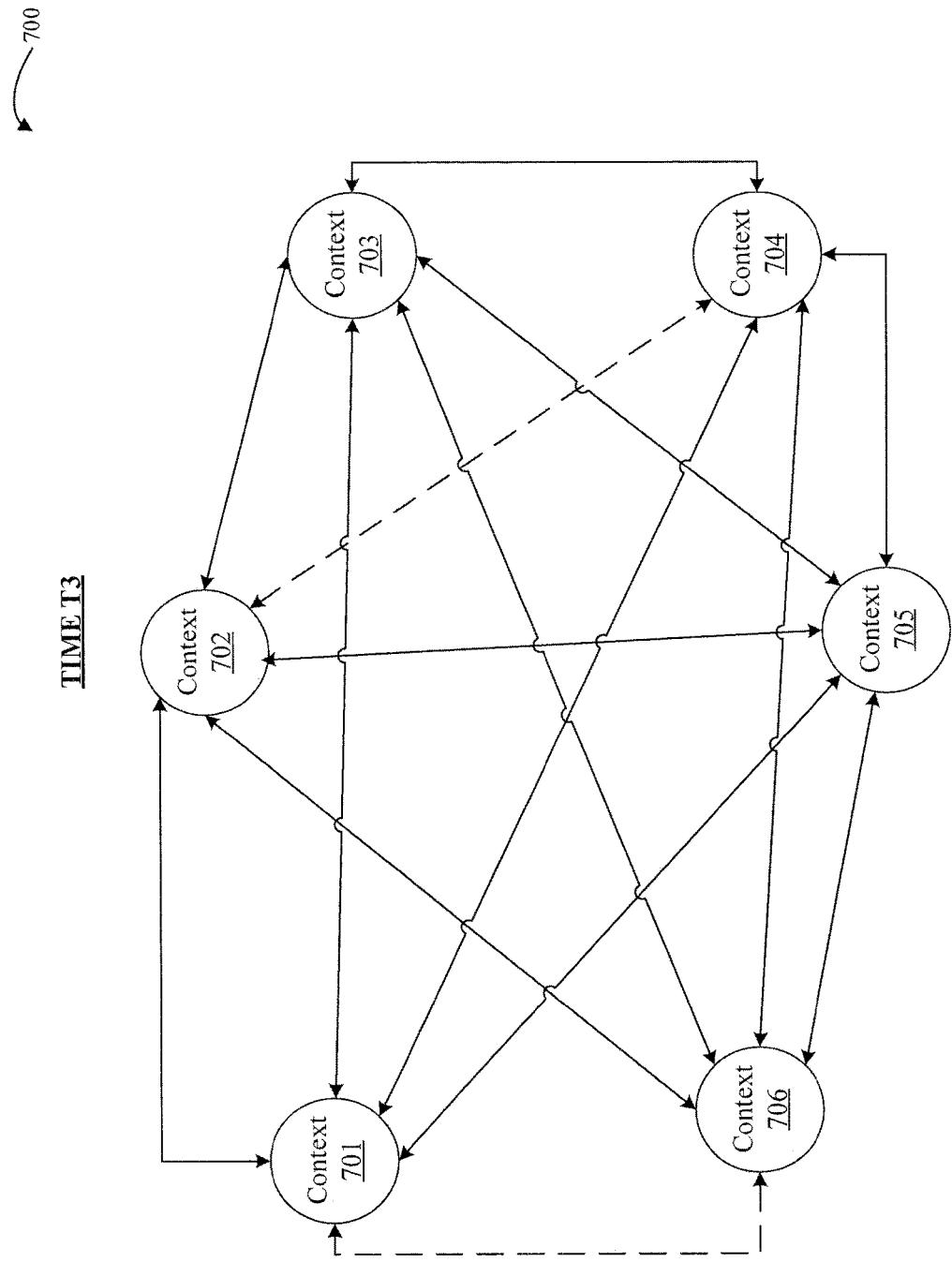

FIGS. 7A-7C illustrate, in block diagram form, a 2D graphical approximation of an exemplary multi-dimensional context graph 700 at three different times T1, T2, and T3 in accordance with one embodiment. Here, T3 occurs after T2 and T1, and T2 occurs after T1. The exemplary context graph 700 in FIGS. 7A-7C can be generated and/or used by the embodiments of an intelli-interface described herein (e.g., the intelli-interface described above in connection with FIGS. 1-6, etc.)

With specific regard now to FIG. 7A, a 2D graphical approximation of an exemplary context graph 700 associated with a single user account at time T1 is illustrated. As shown, the context graph 700 includes one cluster of context ("context cluster") comprised of six contexts 701-706. As used herein, a "context cluster," a "cluster of contexts," and their variations refers to a group of one or more contexts that is based on a relationship between the user account being serviced and an entity. In FIG. 7A, each of the contexts 701-706 in the context cluster of graph 700 is based on a relationship between User A (i.e., the user account being serviced) and an entity (e.g., User A himself, a friend of User A, a IoT device, a ride sharing service, a corporation, etc.). It is to be appreciated that there can be any number of contexts (i.e., at least one context) in the context graph 700 and that the context cluster in graph 700 can include any number of contexts.

The context graph 700 shown in FIG. 7A includes several edges between the nodes representing contexts 701-706. Each of these edges represents a correlation between its pair of nodes. Furthermore, there can be different types of edges based on a degree of correlation between a pair of nodes (i.e., a pair of contexts). Additionally, each of the edges can be weighted to show a degree of correlation between its pair of nodes. As above explained in connection with FIGS. 1-6, correlations between the contexts 701-706 (i.e., the nodes 701-706) in the graph 700 can be based on acquired data, relationships, and/or predicted data. For one embodiment, one or more of acquired data, relationships, and/or predicted data is valued and combined to form the edge weight. For example, and as illustrated in FIG. 7A, the edges between one or more pairs of the contexts having differing thicknesses to show that the weighting of the correlations can be different. Note that the differing edge weights are not shown in FIGS. 7A-8E to avoid obscuring one or more of the inventive concepts described herein.

Referring now to FIG. 7B, the graph 700 is illustrated at time T2, which occurs after time T1. As time moves from T1 to T2, the data associated with the user account evolves (i.e., changes, increases, reduces, etc.). As shown in FIG. 7B, three edges are now represented using dotted lines at time T2 (as opposed to being represented using solid lines at time T1) while all other edges are illustrated using solid lines at time T2. In FIG. 7A, the edges represented by the dotted lines are different from the edges represented by the solid lines. For a first example, a first pair of nodes that is linked using a dotted line (e.g., nodes 701 and 702, etc.) is less correlated than a second pair of nodes that is linked using a solid line (e.g., nodes 701 and 703, etc.). For a second example, a first pair of nodes that is linked using a dotted line (e.g., nodes 701 and 702, etc.) is more correlated than a second pair of nodes that is linked using a solid line (e.g., nodes 701 and 703, etc.). For a third example, a first pair of nodes that is linked using a dotted line (e.g., nodes 701 and 704, etc.) is not correlated, while a second pair of nodes that is linked using a solid line (e.g., nodes 703 and 706, etc.) is correlated. For a fourth example, a first pair of nodes that is linked using a dotted line (e.g., nodes 701 and 704, etc.) is correlated, while a second pair of nodes that is linked using a solid line (e.g., nodes 703 and 706, etc.) is not correlated. A combination of one or more the immediately preceding examples is possible.

With regard now to FIG. 7C, the graph 700 is illustrated at time T3. Time T3 occurs after T2 such that the data associated with the user account evolves (i.e., changes, increases, reduces, etc.) as time proceeds from T1 to T3. As shown in FIG. 7C, only two edges are now represented using dotted lines at time T3 (as opposed to three edges being represented using dotted lines at time T2) while all other edges are illustrated using solid lines at time T3. As explained above, the dotted and solid lines show that the differing relationships between pairs of nodes in the graph 700. For a first example, and with regard to FIGS. 7B-7C, the correlation between the context 701 and the context 706 at time T2 is different from the correlation between the context 701 and the context 706 at time T3. In addition, the other one of the two dotted lines indicates that the context 702 is no longer correlated with the context 704. For a second example, and with regard to FIGS. 7B-7C, the correlation between the context 702 and the context 704 at time T2 is different from the correlation between the context 702 and the context 704 at time T3.

As shown in FIGS. 7A-7C, data stored in a context graph can evolve over time. That is, the correlations between contexts (i.e., categories of events) can change over time to reflect changes in the tastes, behaviors, and/or preferences of a user. This can assist with improving the accuracy of resolutions to user requests by the embodiments of the intelli-interface described herein.

FIGS. 8A-8E illustrate, in block diagram form, a 2D graphical approximation of an exemplary multi-dimensional context graph 800 comprised of multiple context clusters 801 for entities 811-815 at five different times T1, T2, T3, T4, and T5 in accordance with one embodiment. Here, T5 occurs after T4-T1, T4 occurs after T3-T1, T3 occurs after T2-T1, and T2 occurs after T1. The exemplary context graph 800 in FIGS. 8A-8E can be generated and/or used by the embodiments of an intelli-interface described herein (e.g., the intelli-interface described above in connection with FIGS. 1-6, etc.).

For one embodiment, the context graph 800 comprises multiple context clusters 801-805 associated with a user account to be serviced (e.g., User A's account, etc.). As shown in FIGS. 8A-8E, each of the context clusters 801-805 corresponds to one of the entities 811-815. Note that, as explained above in connection with FIGS. 7A-7C, each of the entities 811-815 has a relationship with the user account having graph 800. Each of the context clusters 801-805 can be similar to or the same as the context cluster of the graph 700, which is described above in connection with FIGS. 7A-7C.

The context graph 800 includes multiple edges within each context cluster (as explained above in connection with FIGS. 7A-7C) and multiple interrelationships 807 between each of the context clusters 801-805. For one embodiment, each of the interrelationships 807 correlates contexts across context clusters that are of the same type (i.e., have at least some data that is the same or similar). For a first example, a context type of "restaurants" in the context cluster 801 is correlated via one of the edges with a context type of "restaurants" in the context cluster 803. For a second example, a context type of "books" in the context cluster 802 is correlated via one of the edges with a context type of "books about Paris, France" in the graph for user 804.

Similar to the graph 700, the graph 800 also evolves as time passes, such that there are different types of correlations (i.e., edges) between nodes (i.e., contexts) of a single context cluster. For example, new relationships are formed, old ones are removed, and existing relationships weaken or strengthen based on contexts relationships within context cluster 805 as time passes from T1-T5, etc. Furthermore, the graph 800 also evolves as time passes because one or more interrelationships 807 between the context clusters 801-805 evolve over time. There are different types of interrelationships 807 between the context clusters. For one embodiment, the discussion provided above in connection with at least FIGS. 7A-7C about differing degrees of correlation and weights of edges is also applicable to the interrelationships 807. For a first example, a first interrelationship between two context clusters may indicate that the two context clusters are more or less correlated to each other than a second interrelationship between the two context clusters.

Figure 8A:
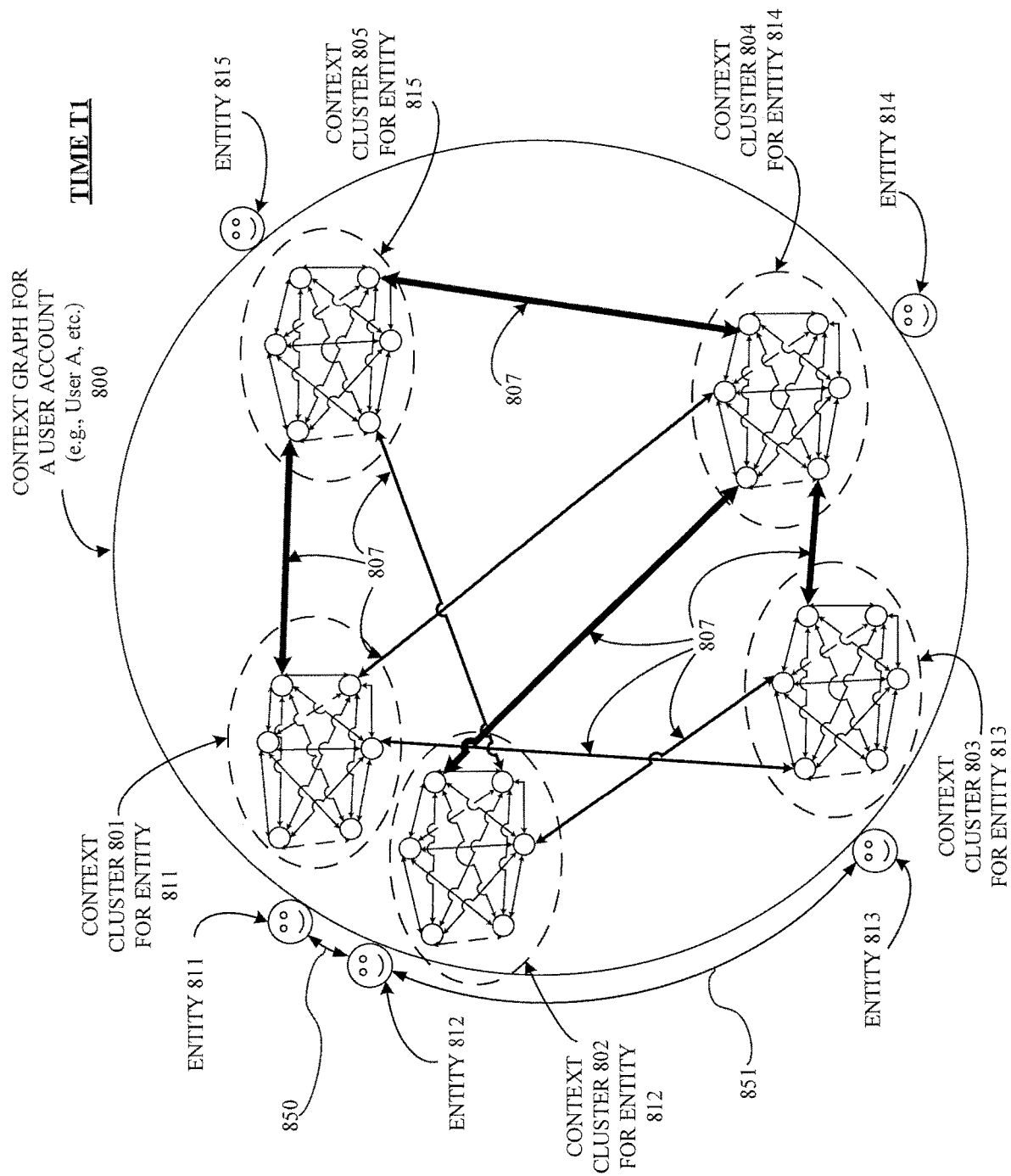
FIGS. 8A-8E illustrate, in block diagram form, a 2D graphical approximation of an exemplary a multi-dimensional context graph comprised of multiple context clusters in accordance with one embodiment. The exemplary context graph illustrated in FIGS. 8A-8E can be generated and/or used by the embodiments of an intelli-interface described herein.

With regard now to FIG. 8A, which shows the graph 800 at a first time T1. In FIG. 8A, a degree of correlation between the context clusters 801-805 is shown by the spatial distance between the entities 801-806 along the circumference of the graph 800. For example, a comparison of distances 850 and 851 indicate that the context cluster 802 associated with the entity 812 is more strongly correlated to the context cluster 801 associated with the entity 815 than the context cluster 803 associated with the entity 813. As explained above, the correlations (and their relative strengths) can evolve over time, which would result in one or more of the distances between the context clusters 801-805 associated with the entities 811-815 changing. For one embodiment, the degree of correlations between the context clusters 801-805 is based on one or more of: (i) the interrelationships 807 between the context clusters 801-805; and (ii) the edges within each of the context clusters 801-805. In FIG. 8A, the interrelationships 807 represented by the thicker lines are different from the interrelationships 807 represented by the narrower lines. For a first example, a first pair of context clusters that is linked using a thicker line (e.g., context graphs 802 and 804, etc.) is less correlated than a second pair of context clusters that is linked using a narrower line (e.g., context clusters 801 and 804, etc.). For a second example, a first pair of context clusters that is linked using a thicker line (e.g., context clusters 801 and 805, etc.) is more correlated than a second pair of context clusters that is linked using a narrower line (e.g., context clusters 801 and 803, etc.). For a third example, a first pair of context clusters that is linked using a thicker line (e.g., context clusters 803 and 804, etc.) is not correlated, while a second pair of context clusters that is linked using a narrower line (e.g., context clusters 802 and 805, etc.) is correlated. The examples in this paragraph are merely illustrative and can be varied or combined without departing from the scope of the inventive concepts described herein.

Figure 8B:
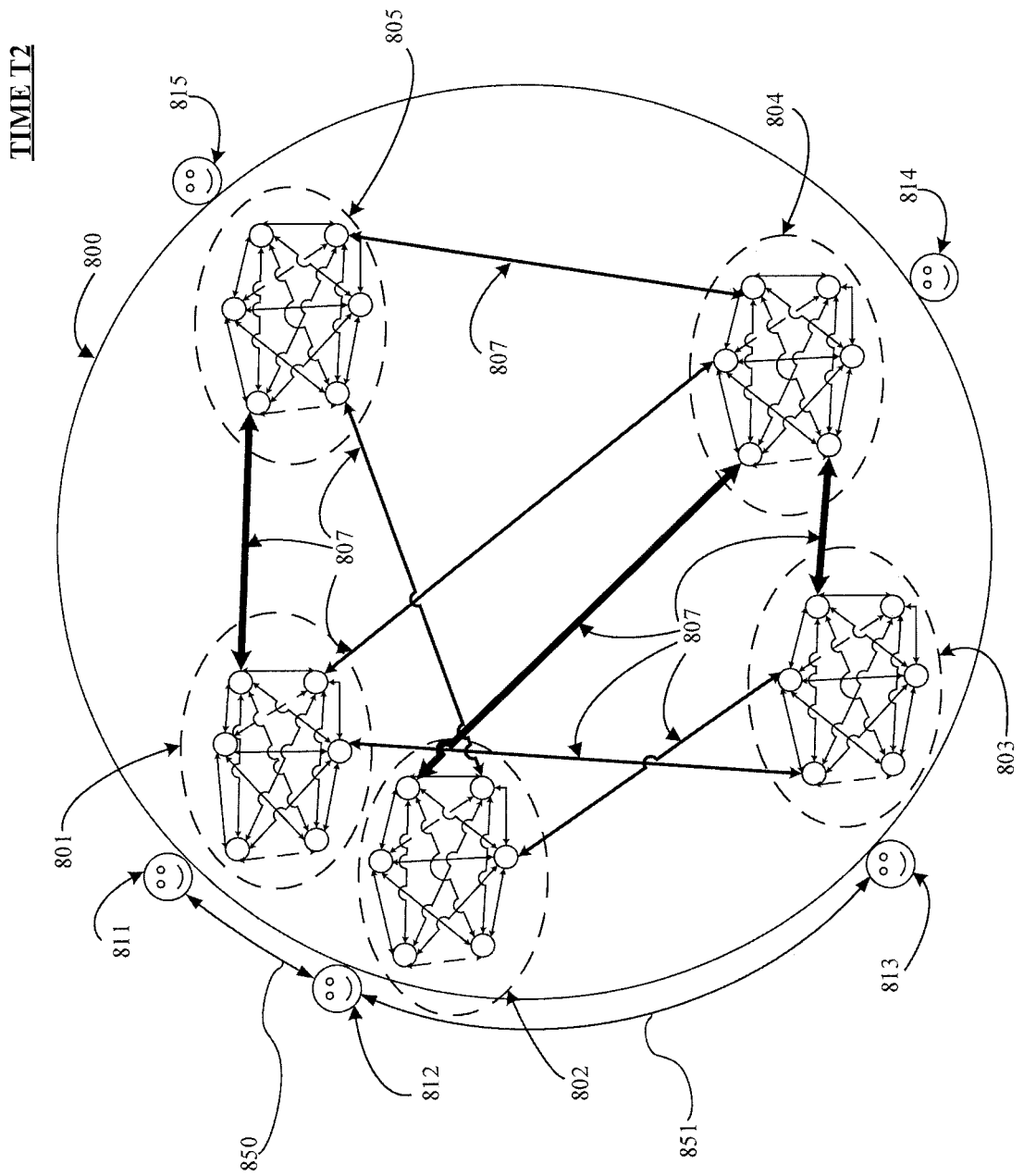

FIG. 8B shows the graph 800 at a second time T2, which occurs after time T1. A comparison of FIGS. 8A and 8B shows that the distance 850 has increased at time T2. Consequently, the degree of correlation between the context clusters 801 and 802 is reducing (i.e., changing over time). Furthermore, a comparison of the graph 800 at times T1 and T2 shows that some of the interrelationships have changed. For example, an interrelationship 807 between the context clusters 804 and 805 has changed from a thicker line to a narrower line to represent the change in the interrelationship.

Figure 8C:
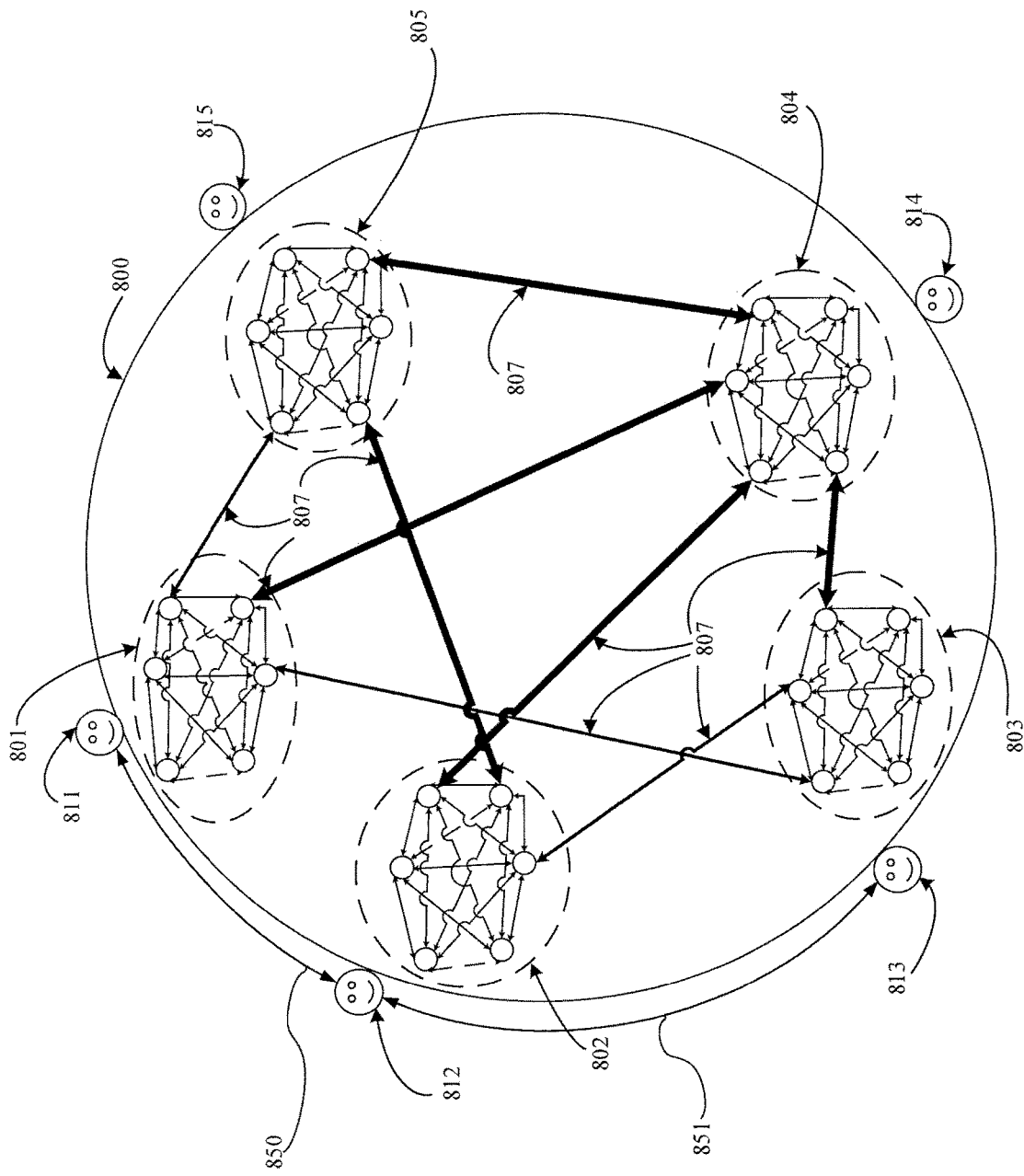

FIG. 8C shows the graph 800 at a third time T3, which occurs after time T2. A comparison of FIGS. 8A-B and 8C shows that the distance 850 has increased at time T3. Consequently, the degree of correlation between the context clusters 801 and 802 is reducing (i.e., changing over time). Furthermore, a comparison of the graph 800 at times T2 and T3 shows that some of the interrelationships have changed. For example, an interrelationship 807 between the context clusters 804 and 805 has changed from a solid line to a dotted line to represent the change in the interrelationship. One or more other changes in the interrelationships between the context clusters shown in FIGS. 8B-8C are evident from inspection of the drawings.

Figure 8D:
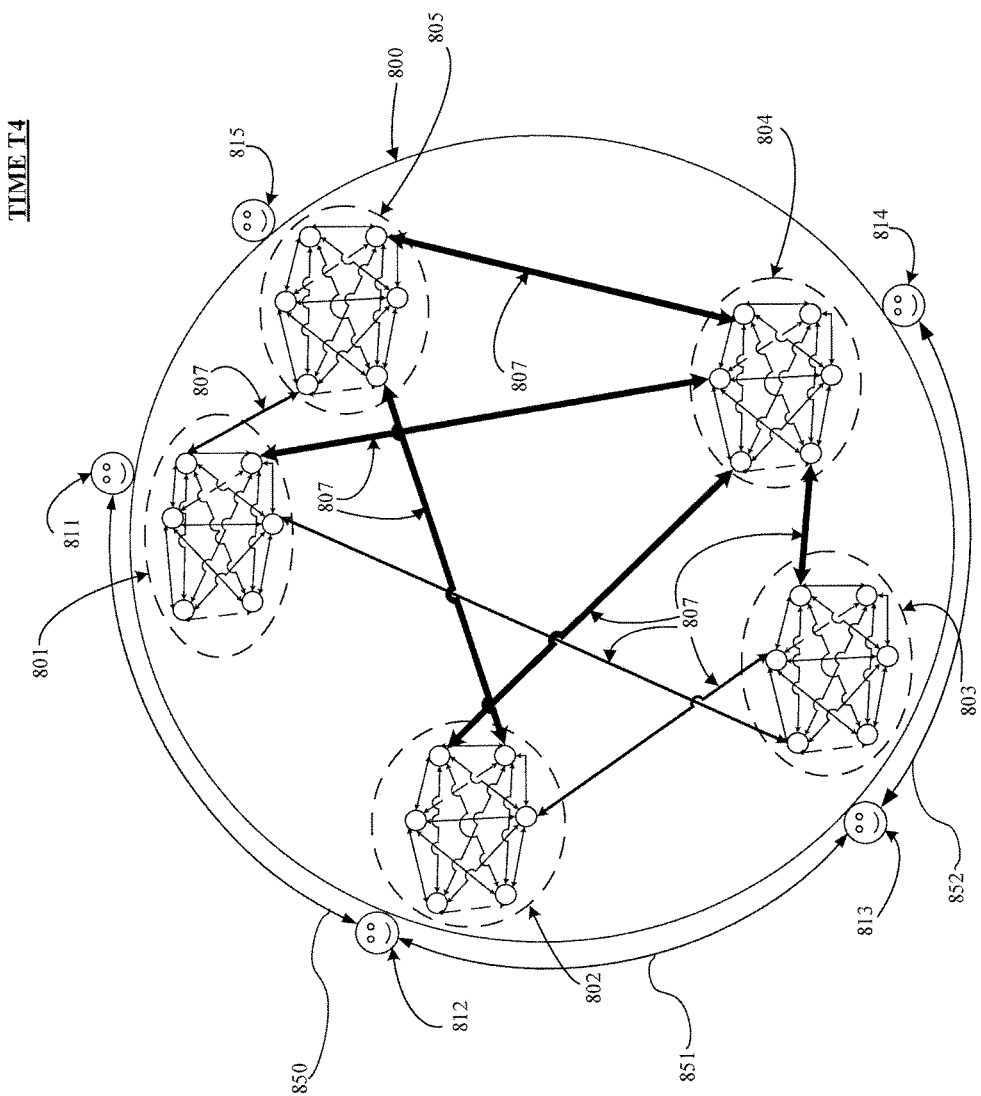

FIG. 8D shows the graph 800 at a third time T4 which occurs after time T3. A comparison of FIGS. 8A-C and 8D shows that the distance 850 has increased at time T4. Consequently, the degree of correlation between the context clusters 801 and 802 is reducing (i.e., changing over time). Furthermore, a comparison of FIGS. 8A-C and 8D shows that the distance 852 between the context clusters 803 and 804 decreases at time T4. Hence, the degree of correlation between the context clusters 803 and 804 is increasing (i.e., changing over time). Also, a comparison of the graph 800 at times T3 and T4 shows that some of the interrelationships have changed. One or more other changes in the interrelationships between the context clusters shown in FIGS. 8C-8D are evident from inspection of the drawings.

Figure 8E:
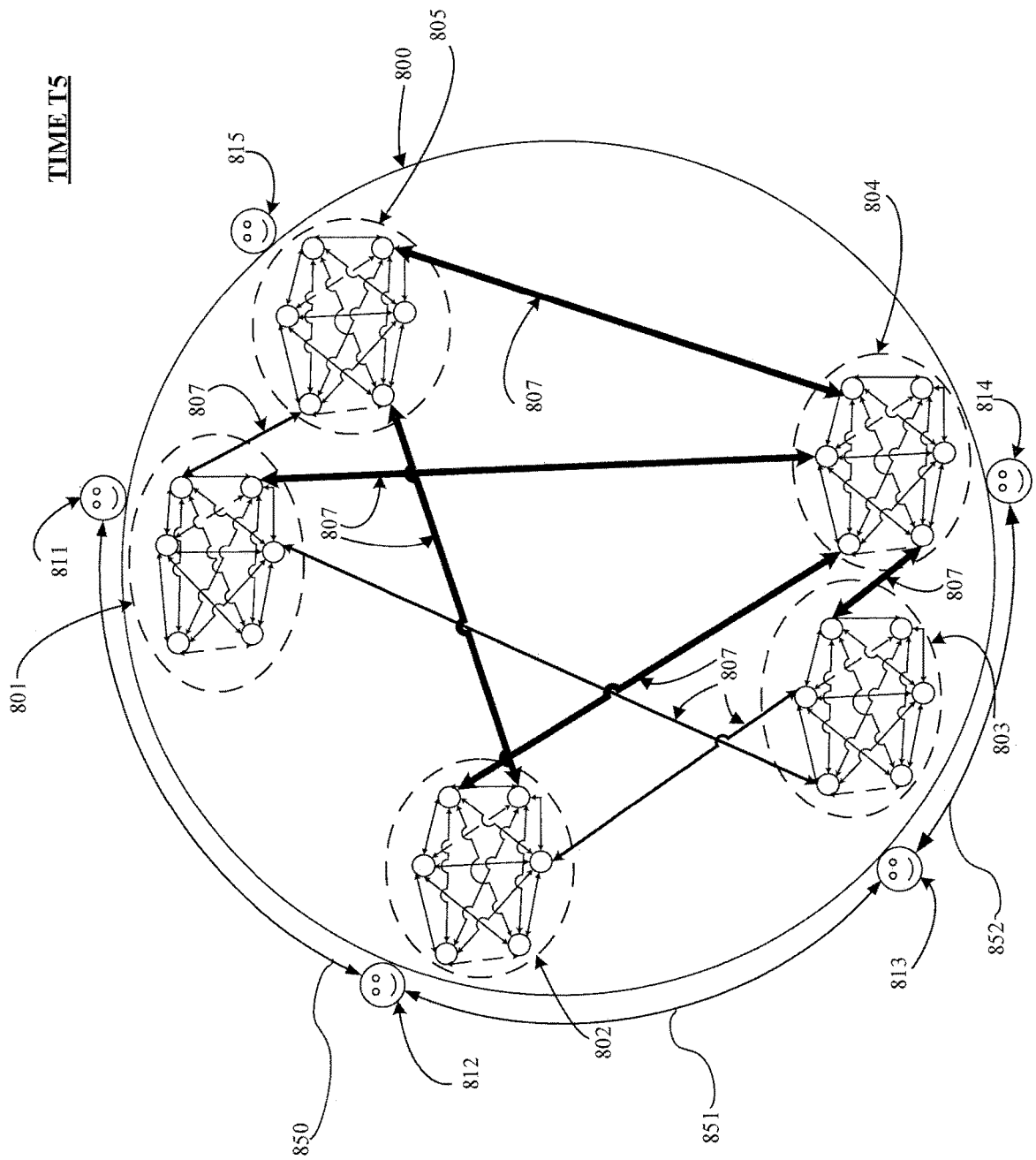

FIG. 8E shows the graph 800 at a third time T5 which occurs after time T4. A comparison of FIGS. 8A-C and 8D shows that the distance 850 has not changed between times T4 and T5. Consequently, the degree of correlation between the context clusters 801 and 802 remains the same (i.e., not changing over time). Furthermore, a comparison of FIGS. 8A-C and 8D shows that the distance 852 between the context clusters 803 and 804 has decreased at time T5. Hence, the similarity between the context clusters 803 and 804 is increasing (i.e., changing over time). Also, a comparison of the graph 800 at times T4 and T5 shows that some of the interrelationships have changed. One or more other changes in the interrelationships between the context clusters shown in FIGS. 8D-8E are evident from inspection of the drawings.

Figure 9:
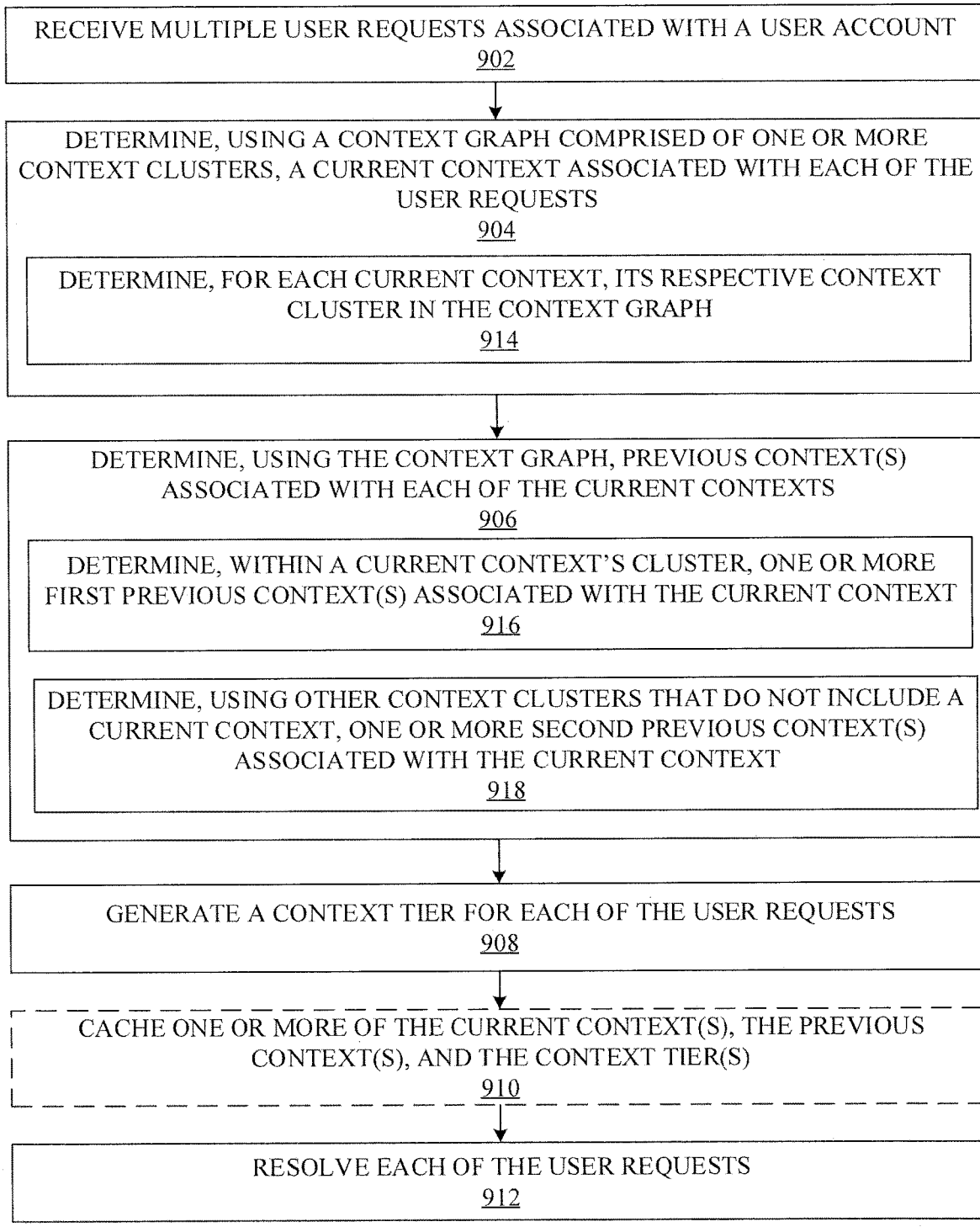
FIG. 9 illustrates, in flowchart form, a technique to service multiple user requests by an intelli-interface in accordance with another embodiment.

FIG. 9 illustrates, in flowchart form, a technique 900 to service multiple user requests associated with a user account by intelli-interface that includes a context graph having multiple context clusters in accordance with an embodiment. Technique 900 can be performed by an intelli-interface (e.g., the interactive interface logic/module 140, the interactive interface service(s) 150, and the context graph 800, etc.).

Technique 900 includes aspects that are similar to those described above in connection with technique 600 of FIG. 6. For brevity, only the differences between technique 900 and 600 are described below in connection with FIG. 9.

Technique 900 begins at operation 902 when an intelli-interface receives multiple user requests from a user account. For example, the intelli-interface receives a first user request and a second user request from a user account. For one embodiment, operation 902 is similar to or the same as operation 602, which is described above in connection with FIG. 6. For one embodiment, operation 902 includes the intelli-interface storing each received requests.

Next, at operation 904, the intelli-interface determines a current context associated with each of the user requests using a context graph comprised of multiple context clusters associated with the user account. Operation 904 can, for one embodiment, include operation 914. Operation 914 includes the intelli-interface determining, for each current context, a context cluster in the context graph that the current context belongs to. Operation 904 includes at least one portion that is similar to or the same as operation 604, which is described above.

Technique 900 proceeds to operation 906. Here, the intelli-interface receives the determined current context(s) for each user account and further determines previous contexts within the respective context graphs that are related to the current context. Operation 906 can, for one embodiment, include operations 916 and 918. Operation 916 includes the intelli-interface determining previous contexts associated with a current context using only that current context's cluster. Operation 916 can be based on the description provided above in connection with FIGS. 3 and 7A-7C. Next, operation 918 includes the intelli-interface determining previous contexts associated with a current context using other context clusters in the context graph that do not include the current context. Operation 918 can be based on the description provided in connection with FIGS. 3 and 8A-8E. Operation 906 includes at least one portion that is similar to or the same as operation 606, so it is not described again for brevity.

Next, at operation 908, the intelli-interface generates a context tier for each of the user requests. Operation 908 is similar to or the same as operation 608 so it is not described again for brevity. Optionally, and as shown in operation 910, each of contexts that make up a context tier are cached to enable improved retrieval and use of the contexts. Operation 910 is similar to or the same as operation 610 so it is not described again for brevity.

Technique 900 proceeds to operation 912. Here, the intelli-interface resolves each of the multiple user requests. Operation 912 is similar to or the same as operation 612, which is described above. Operation 912 also includes, for each request, storing or updating the current context in its respective context graph as a past context that includes information about the resolved user request. For a first example, if a first request from a user account is to "suggest a restaurant that John Doe and I will like" and a second request from the user account is to "suggest a time for a meeting between the Jane Doe and I," the intelligent interactive interface can perform technique 900 to resolve each of these requests. In this example, the context graph associated with the user account can have multiple context clusters—e.g., a context cluster for Jane Doe, a context cluster for John Doe, a context cluster for meetings, a context cluster for restaurants, etc. As will be appreciated, these requests can be resolved independently of each other based on one or more edges within one or more context clusters associated with the user account and/or one or more interrelationships between the one or more context clusters. For this example, the intelligent interactive interface will also update the current contexts in the context graph associated with the user account by converting the current context (i.e., an open context) into a previous context with information about the resolved request (i.e., a closed context). In this way, the intelli-interface updates the context graph, as user requests are resolved. For a second example, if a first request from a user account is to "suggest a museum for Homeri and I when he communicates with me" and a second request from the user account is to "send a text message to the Homeri after I hear from Margei," the intelli-interface can perform technique 900 to resolve each of these requests. In this example, the context graph associated with the user account can have multiple context clusters—e.g., a context cluster for Homeri, a context cluster for Margei, a context cluster for museums, a context cluster for communications between the user and Margei, a context cluster for text messages between the user and Homeri, etc. As will be appreciated, these requests cannot be resolved independently of each other because resolution of the second request depends on resolution of the first request. Also, the resolution of these two requests can based on one or more edges within one or more context clusters associated with the user account and/or one or more interrelationships between the one or more context clusters. Consequently, for this example, the intelli-interface will maintain two current contexts (i.e., open contexts) for the requests. After the intelli-interface resolves the second request of this second example and updates its status in the user's context graph, then the intelli-interface can resolve the first request and update its status in the user's context graph.

For one embodiment, and with regard to the two examples above, each of the first and/or second requests can be maintained as a current context (i.e., an open context) for as long as is necessary (e.g., seconds, minutes, hours, years, decades, etc.) until resolution. For a further embodiment, the interactive interface can request confirmation from the user to complete one or more of the multiple requests if a predetermined amount of time elapsed after receiving the requests.

Figure 10:
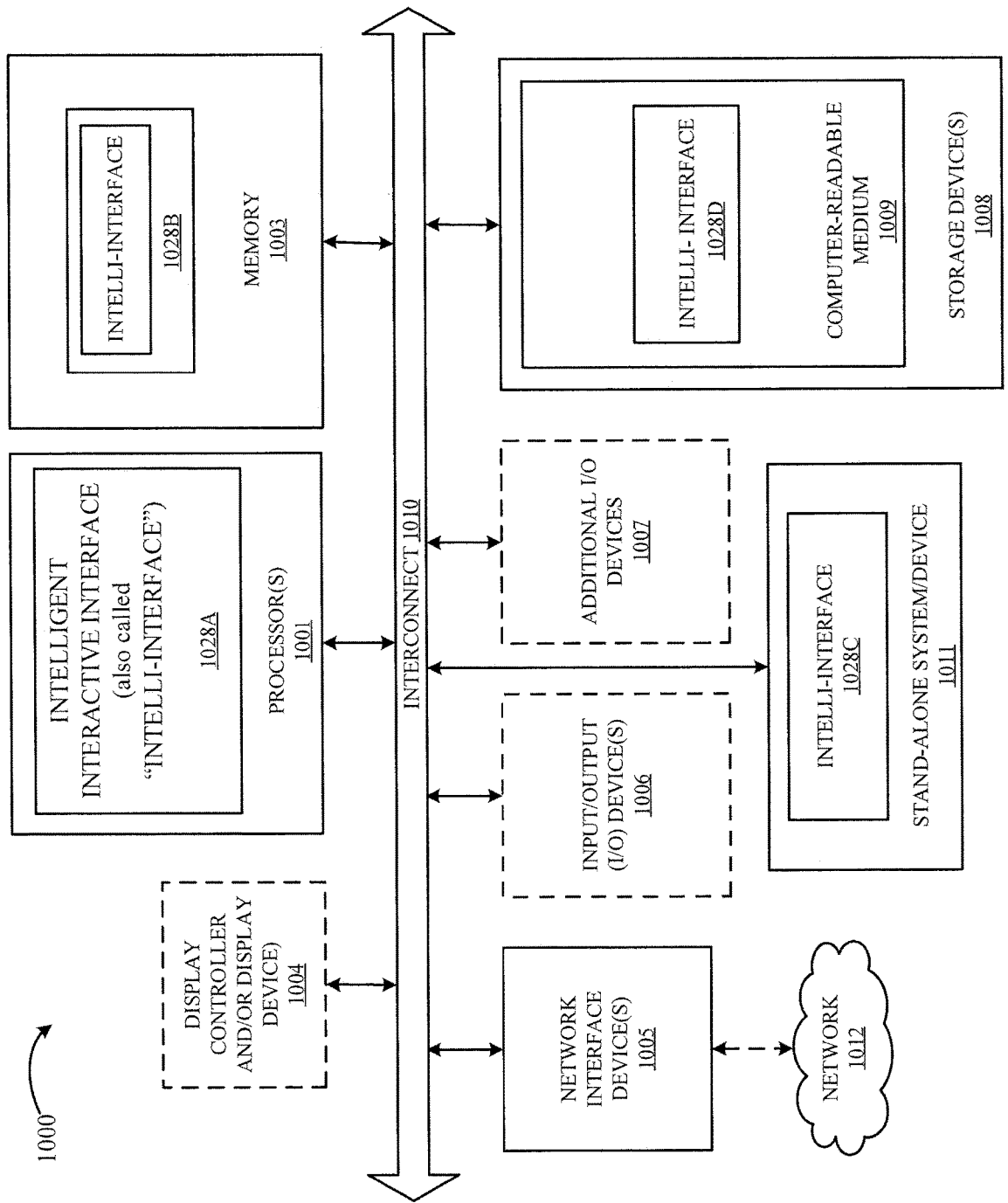
FIG. 10 illustrates an exemplary processing system in accordance with one or more embodiments described herein.

FIG. 10 is a block diagram illustrating an exemplary data processing system 1000 that may be used with one or more of the described embodiments. The description provided below in connection with FIG. 10 refers to intelli-interfaces 1028A-D. For one embodiment, each of the intelli-interfaces 1028A-D is similar to or the same as one or more of the intelli-interfaces described above in connection with one or more of FIGS. 1-9.

The system 1000 may represent any data processing system (e.g., one or more of the systems described above performing any of the operations, techniques, or methods described above in connection with one or more of FIGS. 1-9, etc.). System 1000 can include many different components. These components can be implemented as integrated circuits (ICs), portions thereof, discrete electronic devices, or other modules adapted to a circuit board such as a motherboard or add-in card of a computer system, or as components otherwise incorporated within a chassis of a computer system. Note that system 1000 is intended to show a high-level view of many, but not all, components of the computer system. Nevertheless, it is to be understood that additional components may be present in certain implementations and furthermore, different arrangements of the components shown may occur in other implementations. System 1000 may include, but is not limited to, a desktop computer system, a laptop computer system, a tablet computer system, a server computer system, a mobile phone, a media player, a personal digital assistant (PDA), a personal communicator, a gaming device, a network router or hub, a wireless access point (AP) or repeater, a set-top box, a programmable device, a network-connected device, an IoT device, or a combination thereof. Further, while only a single machine or system is illustrated, the term "machine" or "system" shall also be taken to include any collection of machines or systems that individually or jointly execute instructions to perform any of the methodologies discussed herein.

For one embodiment, system 1000 includes processor(s) 1001, memory 1003, devices 1005-1009, and device 1011 via a bus or an interconnect 1010. System 1000 also includes a network 1012. Processor(s) 1001 may represent a single processor or multiple processors with a single processor core or multiple processor cores included therein. Processor(s) 1001 may represent one or more general-purpose processors such as a microprocessor, a central processing unit (CPU), graphics processing unit (GPU), or the like. More particularly, processor(s) 1001 may be a complex instruction set computer (CISC), a reduced instruction set computer (RISC) or a very long instruction word (VLIW) computer architecture processor, or processors implementing a combination of instruction sets. Processor(s) 1001 may also be one or more special-purpose processors such as an application specific integrated circuit (ASIC), an application-specific instruction set processor (ASIP), a cellular or baseband processor, a field programmable gate array (FPGA), a digital signal processor (DSP), a physics processing unit (PPU), an image processor, an audio processor, a network processor, a graphics processor, a graphics processing unit (GPU), a network processor, a communications processor, a cryptographic processor, a co-processor, an embedded processor, a floating-point unit (FPU), or any logic that can process instructions.

Processor(s) 1001, which may be a low power multi-core processor socket such as an ultra-low voltage processor, may act as a main processing unit and central hub for communication with the various components of the system. Such processor(s) can be implemented as one or more system-on-chip (SoC) integrated circuits (ICs). An intelli-interface 1028A may reside, completely or at least partially, within processor(s) 1001. For one embodiment, the intelli-interface 1028A enables the processor(s) 1001 to perform any or all of the operations or methods described above in connection with FIGS. 1-9. Additionally or alternatively, the processor(s) 1001 may be configured to execute instructions for performing the operations and methodologies discussed herein.

System 1000 may further include a graphics interface that communicates with optional graphics subsystem 1004, which may include a display controller, a graphics processing unit (GPU), and/or a display device. Processor(s) 1001 may communicate with memory 1003, which in one embodiment can be implemented via multiple memory devices to provide for a given amount of system memory. Memory 1003 may include one or more volatile storage (or memory) devices such as random access memory (RAM), dynamic RAM (DRAM), synchronous DRAM (SDRAM), static RAM (SRAM), or other types of storage devices. Memory 1003 may store information including sequences of instructions that are executed by processor(s) 1001 or any other device. For example, executable code and/or data from a variety of operating systems, device drivers, firmware (e.g., input output basic system or BIOS), and/or applications can be loaded in memory 1003 and executed by processor(s) 1001. An operating system can be any kind of operating system. An intelli-interface 1028D may also reside, completely or at least partially, within memory 1003.

For one embodiment, the memory 1003 includes an intelli-interface 1028B as executable instructions. For another embodiment, when the instructions represented by the intelli-interface 1028B are executed by the processor(s) 1001, the instructions cause the processor(s) 1001 to perform any, all, or some of the operations or methods described above in connection with FIGS. 1-9.

System 1000 may further include I/O devices such as devices 1005-1008, including network interface device(s) 1005, optional input device(s) 1006, and other optional I/O device(s) 1007. Network interface device 1005 may include a wired or wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1006 may include a mouse, a touch pad, a touch sensitive screen (which may be integrated with display device 1004), a pointer device such as a stylus, and/or a keyboard (e.g., a physical keyboard or a virtual keyboard displayed as part of a touch sensitive screen). For example, input device 1006 may include a touch screen controller coupled to a touch screen. The touch screen and touch screen controller can, for example, detect contact and movement or a break thereof using one or more touch sensitivity technologies, including but not limited to capacitive, resistive, infrared, and surface acoustic wave technologies, as well as other proximity sensor arrays or other elements for determining one or more points of contact with the touch screen.

I/O devices 1007 may include an audio device. An audio device may include a speaker and/or a microphone to facilitate voice-enabled functions, such as voice recognition, voice replication, digital recording, and/or telephony functions. Other I/O devices 1007 may include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Device(s) 1007 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1010 via a sensor hub (not shown), while other devices such as a keyboard or thermal sensor may be controlled by an embedded controller (not shown), dependent upon the specific configuration or design of system 1000.

To provide for persistent storage for information such as data, applications, one or more operating systems and so forth, a mass storage device or devices (not shown) may also be coupled to processor(s) 1001. For various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. In addition, a flash device may be coupled to processor(s) 1001, e.g., via a serial optional peripheral interface (SPI). This flash device may provide for non-volatile storage of system software, including a basic input/output software (BIOS) and other firmware.

An intelli-interface 1028C may be part of a specialized stand-alone computing system/device 1011 that is formed from hardware, software, or a combination thereof. For one embodiment, the intelli-interface 1028C performs any, all, or some of the operations or methods described above in connection with FIGS. 1-9.

Storage device 1008 may include computer-accessible storage medium 1009 (also known as a machine-readable storage medium or a computer-readable medium) on which is stored one or more sets of instructions or software—e.g., an intelli-interface 1028D.

For one embodiment, the instruction(s) or software stored on storage medium 1009 embody one or more methodologies or functions described above in connection with FIGS. 1-9. For another embodiment, the storage device 1008 includes an intelli-interface 1028D as executable instructions. When the instructions represented by an intelli-interface 1028D are executed by the processor(s) 1001, the instructions cause the system 1000 to perform any, all, or some of the operations or methods described above in connection with FIGS. 1-9.

Computer-readable storage medium 1009 can store some or all of the software functionalities of an intelli-interface 1028A-D described above persistently. While computer-readable storage medium 1009 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the system 1000 and that cause the system 1000 to perform any one or more of the disclosed methodologies. The term "computer-readable storage medium" shall accordingly be taken to include, but not be limited to, solid-state memories, and optical and magnetic media, or any other non-transitory machine-readable medium.

Note that while system 1000 is illustrated with various components of a data processing system, it is not intended to represent any particular architecture or manner of interconnecting the components; as such, details are not germane to the embodiments described herein. It will also be appreciated that network computers, handheld computers, mobile phones, servers, and/or other data processing systems, which have fewer components or perhaps more components, may also be used with the embodiments described herein.

In the foregoing description, numerous specific details are set forth, such as specific configurations, dimensions and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

In the following description and claims, the terms "coupled" and "connected," along with their derivatives, may be used. It should be understood that these terms are not intended as synonyms for each other. "Coupled" is used to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing system, that manipulates and transforms data represented as physical (electronic) quantities within the computer system's registers and memories into other data similarly represented as physical quantities within the computer system memories or registers or other such information storage, transmission or display devices.

Embodiments described herein can relate to an apparatus for performing a computer program (e.g., the operations described herein, etc.). Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although operations or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the various embodiments of the disclosed subject matter. In utilizing the various aspects of the embodiments described herein, it would become apparent to one skilled in the art that combinations, modifications, or variations of the above embodiments are possible for managing components of a processing system to increase the power and performance of at least one of those components. Thus, it will be evident that various modifications may be made thereto without departing from the broader spirit and scope of at least one of the disclosed concepts set forth in the following claims. The specification and drawings are, accordingly, to be regarded in an illustrative sense rather than a restrictive sense.

In the development of any actual implementation of one or more of the disclosed concepts (e.g., such as a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the disclosed concepts set forth in the embodiments described herein. Such development efforts might be complex and time-consuming, but may still be a routine undertaking for a person having ordinary skill in the art in the design and/or implementation of one or more of the inventive concepts set forth in the embodiments described herein.

One aspect of the present technology is the gathering and use of data available from various sources to improve the operation of the interactive interfaces. The present disclosure contemplates that in some instances, this gathered data may include personal information data that uniquely identifies a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to improve the resolution of requests by an interactive interface. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of the present context network, the present technology can be configured to allow users to select to "opt in" or "opt out" of participation in the collection of personal information data for use in generating a context network.

Although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

As used in the description above and the claims below, the phrase "at least one of A, B, or C" includes A alone, B alone, C alone, a combination of A and B, a combination of B and C, a combination of A and C, and a combination of A, B, and C. That is, the phrase "at least one of A, B, or C" means A, B, C, or any combination thereof such that one or more of a group of elements consisting of A, B and C, and should not be interpreted as requiring at least one of each of the listed elements A, B and C, regardless of whether A, B and C are related as categories or otherwise. Furthermore, the use of the article "a" or "the" in introducing an element should not be interpreted as being exclusive of a plurality of elements. In addition, the recitation of "A, B and/or C" is equal to "at least one of A, B or C."

Also, the use of "a" refers to "one or more" in the present disclosure. For example, "a context" refers to "one or more contexts."

What is claimed is:

1. A computer-implemented method for resolving multiple user requests from a user account by an interactive interface, comprising:
   obtaining, by a processor, a context graph associated with a user account, wherein the context graph comprises correlated contexts related to the user account, wherein a context in the correlated contexts comprises an association of two or more related user life events that are identified as macro context or micro context with varying levels of granularity based on a temporal variation of the context, wherein each context is represented as a node in the context graph, wherein each node in the context graph comprises the macro context or the micro context as one of an open context for an ongoing one or a closed context for a past one of the two or more related user life events with a categorical identifier and a temporal identifier for each of the two or more related user life events, wherein each correlation between two contexts is represented as an edge in the context graph that comprises a line type identifying a weighted correlation between the two contexts, wherein the context graph includes one or more context clusters, and wherein each correlation between two context clusters is represented as an interrelationship in the context graph;

receiving a first user request and a second user request, each of the requests being associated with the user account; and for each of the first and second user requests:
   determining, based on the context graph, a current context for the user request and one or more previous contexts that are related to the current context, wherein the current context and the one or more previous contexts are part of a same context cluster;
   arranging, in the interactive interface, the current context with the one or more previous contexts, wherein the arranging displays the line type for the weighted correlation between the two contexts with the open context or the closed context having the categorical identifier and the temporal identifier for each of the two or more related user life events with a categorical identifier and a temporal identifier;
   resolving the user request based on the current context and the one or more previous contexts; and
   displaying the resolved user request with the arranged current context with the arranged one or more previous contexts in the interactive interface.

2. The method of claim 1, further comprising updating the one or more interrelationships between context clusters as data associated with the user account evolves, wherein the correlated contexts are differentiated based on their varying levels of granularity.

3. The method of claim 2, wherein determining the one or more first previous contexts includes determining a context cluster to which the current context belongs.

4. The method of claim 3, further comprising determining, for each current cluster, that the current context's cluster is related to another context cluster based on one or more interrelationships between the current context's cluster and the other cluster, or based on one or more edges within the current context's cluster.

5. The method of claim 1, wherein one or more contexts from one or more past events that are varied temporally are used to continually re-process and re-train to redefine the granularity of the correlated contexts.

6. The method of claim 5, wherein the varying levels of granularity comprise defined categories of a first type and defined categories of a second type narrower than the first type.

7. The method of claim 1, wherein the two or more related user life events comprise a soft event or a hard event, the soft event comprising an event based on predicted data and the hard event comprising an event based on acquired data.

8. A non-transitory computer readable medium comprising instructions for resolving multiple user requests from a user account by an interactive interface, which when executed by one or more processors, cause the one or more processors to:
   obtain a context graph associated with a user account, wherein a context comprises an association of two or more related user life events that are differentiated based on varying levels of granularity, wherein the context graph comprises correlated contexts related to the user account, wherein each context is represented as node in the context graph, wherein each correlation between two contexts is represented as an edge in the context graph, wherein the context graph includes one or more context clusters, wherein each node in the context graph comprises the macro context or the micro context as one of an open context for an ongoing one or a closed context for a past one of the two or more related user life events with a categorical identifier and a temporal identifier for each of the two or more related user life events, and wherein each correlation between two context clusters is represented as an interrelationship in the context graph that comprises a line type identifying a weighted correlation between the two contexts;
   receive a first user request and a second user request, each of the requests being associated with the user account; and
   for each of the first and second user requests:
      determine, based on the context graph, a current context for the user request and
      one or more previous contexts that are related to the current context, wherein the current context and the one or more previous contexts are not part of a same context cluster;
      arrange, in the interactive interface, the current context with the one or more previous contexts, wherein the arranging displays the line type for the weighted correlation between the two contexts with the open context or the closed context having the categorical identifier and the temporal identifier for each of the two or more related user life events with a categorical identifier and a temporal identifier;
      resolve the user request based on the current context and the one or more previous contexts; and
      display the resolved user request with the arranged current context with the arranged one or more previous contexts in the interactive interface.

9. The non-transitory computer readable medium of claim 8, further comprising instructions for causing the one or more processors to update the one or more interrelationships between context clusters as data associated with the user account evolves.

10. The non-transitory computer readable medium of claim 8, wherein the varying levels of granularity are redefined via one or more past events that are varied temporally and the redefined granularity is used to continually re-process and re-train the context graph.

11. The non-transitory computer readable medium of claim 10, further comprising instructions for causing the one or more processors to determine, for each current cluster, that the current context's cluster is related to another context cluster based on one or more interrelationships between the current context's cluster and the other cluster, or based on one or more edges within the current context's cluster.

12. The non-transitory computer readable medium of claim 10, wherein the two or more related user life events comprise a soft event or a hard event, the soft event comprising an event based on predicted soft data and the hard event comprising an event based on acquired hard data.

13. The non-transitory computer readable medium of claim 12, wherein the acquired hard data is used to generate correlations between two nodes by generating a new edge between a pair of contexts represented as nodes in the context graph.

14. The non-transitory computer readable medium of claim 8, wherein the varying levels of granularity comprise macro context directed to defined categories of a first type and micro context directed to defined categories of a second type, wherein the macro context and the micro context are varied temporally.

15. A processing system configured to resolve multiple user requests from multiple user accounts, comprising:
    logic configured to:
        obtain a context graph associated with a user account, wherein a context comprises an association of two or more related user life events that are identified as a temporal macro context or temporal micro context, wherein the context graph comprises correlated contexts related to the user account, wherein one or more contexts from one or more past events are used to continually re-process and re-train the context graph, wherein each context is represented as node in the context graph, wherein each correlation between two contexts is represented as an edge in the context graph, and wherein the context graph includes one or more context clusters, wherein each node in the context graph comprises the macro context or the micro context as one of an open context for an ongoing one or a closed context for a past one of the two or more related user life events with a categorical identifier and a temporal identifier for each of the two or more related user life events, and wherein each correlation between two context clusters is represented as an interrelationship in the context graph that comprises a line type identifying a weighted correlation between the two contexts;
        receive a first user request and a second user request, each of the requests being associated with the user account; and
        for each of the first and second user requests:
            determine, based on the context graph, a current context for the user request and one or more first previous contexts that are related to the current context, wherein the current context and the one or more first previous contexts are part of a same context cluster;
            determine, based on the context graph, one or more second previous contexts that are related to the current context, wherein the current context and the one or more second previous contexts are not part of the same context cluster;
            arrange, in an interactive interface, the current context with the one or more previous contexts, wherein the arranging displays the line type for the weighted correlation between the two contexts with the open context or the closed context having the categorical identifier and the temporal identifier for each of the two or more related user life events with a categorical identifier and a temporal identifier;
            resolve the user request based on the current context, the one or more first previous contexts, and the one or more second previous contexts; and
            display the resolved user request with the arranged current context with the arranged one or more previous contexts in the interactive interface.

16. The system of claim 15, wherein the logic is further configured to update the one or more interrelationships between context clusters as data associated with the user account evolves, and wherein the macro context includes defined categories of a first type and the micro context includes defined categories of a second type different from the first type.

17. The system of claim 16, wherein the two or more related user life events comprise a soft event or a hard event, the soft event comprising an event based on predicted soft data and the hard event comprising an event based on acquired hard data.

18. The system of claim 17, wherein the acquired hard data is used to generate correlations between two nodes by generating a new edge between a pair of contexts represented as nodes in the context graph.

19. The system of claim 18, wherein the predicted soft data is used to augment the generated correlations between the two nodes by weighting previously generated edges between the pair of contexts represented as the nodes in the context graph.

20. The system of claim 15, wherein varying levels of granularity is redefined based on the temporal macro context or the temporal micro context and the redefined levels of granularity are used to continually re-process and re-train the context graph.

* * * * *